United States Patent
Hatfield et al.

(10) Patent No.: US 10,755,697 B2
(45) Date of Patent: *Aug. 25, 2020

(54) VOICE COMMAND TRIGGERED SPEECH ENHANCEMENT

(71) Applicant: Cirrus Logic International Semiconductor Ltd., Edinburgh (GB)

(72) Inventors: Robert James Hatfield, Edinburgh (GB); Michael Page, Oxfordshire (GB)

(73) Assignee: Cirrus Logic, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/393,542

(22) Filed: Apr. 24, 2019

(65) Prior Publication Data
US 2019/0251954 A1 Aug. 15, 2019

Related U.S. Application Data

(63) Continuation of application No. 15/688,380, filed on Aug. 28, 2017, now Pat. No. 10,319,372, which is a (Continued)

(30) Foreign Application Priority Data

Dec. 18, 2013 (GB) ..................................... 1322349

(51) Int. Cl.
*G10L 15/00* (2013.01)
*G10L 15/08* (2006.01)
(Continued)

(52) U.S. Cl.
CPC ............ *G10L 15/08* (2013.01); *G10L 15/063* (2013.01); *G10L 15/20* (2013.01); *G10L 15/22* (2013.01);
(Continued)

(58) Field of Classification Search
USPC .................................. 704/231–257, 270–275
See application file for complete search history.

(56) References Cited

U.S. PATENT DOCUMENTS 6,839,669 B1  1/2005  Gould et al.
7,698,136 B1  4/2010  Nguyen et al.
(Continued)

FOREIGN PATENT DOCUMENTS

CN  1918461 A   2/2007
CN  10163664 A  1/2010
EP  1400814 A2  3/2004

OTHER PUBLICATIONS

Search Report, China National Intellectual Property Administration, Patent Application No. 2014800757908, dated Mar. 1, 2019.
(Continued)

*Primary Examiner* — Jesse S Pullias
(74) *Attorney, Agent, or Firm* — Jackson Walker L.L.P.

(57) ABSTRACT

Received data representing speech is stored, and a trigger detection block detects a presence of data representing a trigger phrase in the received data. In response, a first part of the stored data representing at least a part of the trigger phrase is supplied to an adaptive speech enhancement block, which is trained on the first part of the stored data to derive adapted parameters for the speech enhancement block. A second part of the stored data, overlapping with the first part of the stored data, is supplied to the adaptive speech enhancement block operating with said adapted parameters, to form enhanced stored data. A second trigger phrase detection block detects the presence of data representing the trigger phrase in the enhanced stored data. In response, enhanced speech data are output from the speech enhancement block for further processing, such as speech recognition.

19 Claims, 12 Drawing Sheets

Related U.S. Application Data continuation of application No. 15/105,882, filed as application No. PCT/GB2014/053738 on Dec. 17, 2014, now Pat. No. 9,779,726.

(51) Int. Cl.

| | | |
|---|---|---|
| *G10L 15/22* | (2006.01) | |
| *G10L 21/0208* | (2013.01) | |
| *G10L 15/06* | (2013.01) | |
| *G10L 15/20* | (2006.01) | |
| *G10L 15/28* | (2013.01) | |
| *G10L 21/0216* | (2013.01) | |
| *G10L 25/84* | (2013.01) | |

(52) U.S. Cl.
CPC ........ *G10L 15/285* (2013.01); *G10L 21/0208* (2013.01); *G10L 21/0216* (2013.01); *G10L 25/84* (2013.01); *G10L 2015/088* (2013.01); *G10L 2021/02166* (2013.01)

(56) References Cited

U.S. PATENT DOCUMENTS

| | | |
|---|---|---|
| 9,779,726 B2 | 10/2017 | Hatfield et al. |
| 10,319,372 B2 * | 6/2019 | Hatfield .............. G10L 21/0216 |
| 2002/0029141 A1 | 3/2002 | Cox et al. |
| 2005/0049864 A1 | 3/2005 | Kaltenmeier et al. |
| 2005/0114124 A1 | 5/2005 | Lin et al. |
| 2005/0203740 A1 | 9/2005 | Chambers et al. |
| 2010/0225461 A1 | 9/2010 | Tuli |
| 2010/0241428 A1 | 9/2010 | Yiu |
| 2010/0312557 A1 | 12/2010 | Strom et al. |

OTHER PUBLICATIONS

First Office Action, China National Intellectual Property Administration, Patent Application No. 2014800757908, dated Mar. 11, 2019.

International Search Report and Written Opinion, International Application No. PCT/GB2014/053738, dated May 11, 2015, 15 pages.

Second Office Action, National Intellectual Property Administration, PRC, Application No. 2014800757908, dated Aug. 19, 2019.

Search Report, National Intellectual Property Administration, PRC, Application No. 2014800757908, dated Aug. 9, 2019.

* cited by examiner

VOICE COMMAND TRIGGERED SPEECH ENHANCEMENT

REFERENCE TO PREVIOUSLY FILED APPLICATIONS

This application is a continuation of U.S. Non-Provisional Patent application Ser. No. 15/688,380, filed Aug. 28, 2017, now U.S. Pat. No. 10,319,372, which is a continuation of U.S. Non-Provisional patent application Ser. No. 15/105,882, filed Jun. 17, 2016, now U.S. Pat. No. 9,779,726, which is a 371 application of International Application No. PCT/GB2014/053738, filed Dec. 17, 2014, which claims priority to United Kingdom Patent Application No. 1322349.0, filed Dec. 18, 2013, all of which are incorporated by reference herein in their entirety.

FIELD OF DISCLOSURE

This invention relates to a method of processing received speech data, and a system for implementing such a method.

BACKGROUND

It is known to provide automatic speech recognition (ASR) for mobile devices using remotely-located speech recognition algorithms accessed via the internet. This speech recognition can be used to recognise spoken commands, for example for browsing the internet and for controlling specific functions on, or via, the mobile device. In order to preserve battery life, these mobile devices spend most of their time in a power saving stand-by mode. A trigger phrase may be used to wake the main processor of the device such that speaker verification (i.e. verification of the identity of the person speaking), and/or any other speech analysis service, can be carried out, either within the main processor and/or by a remote analysis service.

In order to improve the recognition rates in the ASR service, it is known to use various signal processing techniques which enhance the audio, i.e. speech, before transmission, for example acoustic echo cancellation, noise reduction and multi-microphone beamforming. Many of these enhancement techniques are adaptive, that is, they modify their parameters dynamically in order to adapt to the acoustic environment in which the microphone signal is being provided. Upon a change of acoustic environment it takes a finite period of time for these parameters to be iteratively adapted to a point where any undesired features, produced by the acoustic environment, are reduced to an insignificant level. This is known as the adaptation time, and for many adaptive audio signal processing algorithms is typically of the order of one second.

Acoustic echo cancellation (AEC) uses an adaptive process as described above to cancel the local loudspeaker contribution that may be picked up by a speech microphone, by using a reference signal derived from the output to the loudspeaker, and an adaptive process to estimate the acoustic transfer function from the loudspeaker to the microphone. This adaptation can take place on any signal output from the loudspeaker. It is therefore not dependent on a signal being input by a user through the microphone. Some typical uses for ASR during loudspeaker operation are voice control of music playback, and voice control during speakerphone telephony. For these cases, the AEC can converge to the environment within one second of the loudspeaker output commencing, and therefore, in most cases the adaptation has reached the required level before a user starts to issue spoken commands.

In contrast, adaptive noise reduction and multi-microphone beamforming are adaptive processes that do depend on a signal being produced containing the user's speech. These adaptive processes cannot start to adapt their parameters until the user's speech is present in the signal from a microphone, and, once the user's speech is present, they take a period of time to adapt to the required level. These adaptive processes may be required to enhance speech for use in ASR immediately following a voice-triggered wake-up from standby. It also may not be feasible to run these speech recognition algorithms in the low-power standby state, as their computational complexity causes the resultant device power consumption to be relatively significant. The net result of this is that the start of the spoken command may not be effectively enhanced, which may cause a poor result in the ASR service.

SUMMARY

According to a first aspect of the present invention, there is provided a method of processing received data representing speech, comprising:
    storing the received data;
    detecting a presence of data representing a trigger phrase in the received data;
    in response to said detecting, supplying a first part of the stored data representing at least a part of the trigger phrase to an adaptive speech enhancement block;
    training the speech enhancement block on the first part of the stored data to derive adapted parameters for the speech enhancement block;
    supplying a second part of the stored data to the adaptive speech enhancement block operating with said adapted parameters, to form enhanced stored data, wherein the second part of the stored data overlaps with the first part of the stored data;
    detecting the presence of data representing the trigger phrase in the enhanced stored data; and
    outputting enhanced speech data from the speech enhancement block for further processing, in response to detecting the presence of data representing the trigger phrase in the enhanced stored data;
    wherein the detecting the presence of data representing the trigger phrase in the received data is carried out by means of a first trigger phrase detection block; and
    wherein the detecting the presence of data representing the trigger phrase in the enhanced stored data is carried out by means of a second trigger phrase detection block, and wherein the second trigger phrase detection block operates with different detection criteria from the first trigger phrase detection block.

According to a second aspect of the present invention, there is provided a speech processor, comprising:
    an input, for receiving data representing speech; and
    an adaptive speech enhancement block,
    wherein the speech processor is configured to perform a method according to the first aspect.

According to a third aspect of the present invention, there is provided a mobile device, comprising a speech processor according to the second aspect.

According to a fourth aspect of the present invention, there is provided a computer program product, comprising computer readable code, for causing a processing device to perform a method according to the first aspect.

According to a fifth aspect of the present invention, there is provided a method of processing received data representing speech, comprising:

on detecting that a segment of the received data represents a trigger phrase: training an adaptive speech enhancement block on at least a part of said segment of the received data to derive parameters for the adaptive speech enhancement block; passing said segment of received data through said adaptive speech enhancement block using said derived parameters to generate an enhanced segment of data; and attempting to detect said trigger phrase in the enhanced segment of data.

According to a sixth aspect of the present invention, there is provided a method of processing received data representing speech, comprising:

detecting an ambient noise level in the received data;

if the ambient noise level is above a first threshold and below a second threshold which is higher than the first threshold, performing a speech enhancement process on the received data, and performing a speech recognition process on data output from the speech enhancement process;

if the ambient noise level is below the first threshold, performing a speech recognition process on the received data unprocessed by said speech enhancement process; and if the ambient noise level is above the second threshold, omitting to perform a speech recognition process on the received data.

According to a seventh aspect of the present invention, there is provided a speech processor, comprising:

an input, for receiving data representing speech; and
an adaptive speech enhancement block,
wherein the speech processor is configured to perform a method according to the sixth aspect.

According to an eighth aspect of the present invention, there is provided a mobile device, comprising a speech processor according to the seventh aspect.

According to a ninth aspect of the present invention, there is provided a computer program product, comprising computer readable code, for causing a processing device to perform a method according to the sixth aspect.

According to a tenth aspect of the present invention, there is provided a method of processing received data representing speech, comprising:

storing the received data;
detecting a presence of data representing a first trigger phrase in the received data;
in response to said detecting, supplying a first part of the stored data representing at least a part of the first trigger phrase to an adaptive speech enhancement block;
training the speech enhancement block on the first part of the stored data to derive adapted parameters for the speech enhancement block;
supplying a second part of the stored data to the adaptive speech enhancement block operating with said adapted parameters, wherein the second part of the stored data overlaps with the first part of the stored data; and
outputting enhanced speech data from the speech enhancement block.

According to an eleventh aspect of the present invention, there is provided a speech processor, comprising:

an input, for receiving data representing speech; and
an adaptive speech enhancement block,
wherein the speech processor is configured to perform a method according to the tenth aspect.

According to a twelfth aspect of the present invention, there is provided a mobile device, comprising a speech processor according to the eleventh aspect.

According to a thirteenth aspect of the present invention, there is provided a computer program product, comprising computer readable code, for causing a processing device to perform a method according to the tenth aspect.

This provides the advantage that, as the received speech data is stored, part of that data can be used to train the speech enhancement algorithms so that adaptation parameters have time to converge. These adaptation parameters can then be applied to the stored data such that data which has been effectively enhanced can be output to a speech processor.

BRIEF DESCRIPTION OF THE DRAWINGS

For a better understanding of the present invention, and to show how it may be put into effect, reference will now be made, by way of example, to the accompanying drawings, in which.

DETAILED DESCRIPTION

Figure 1:
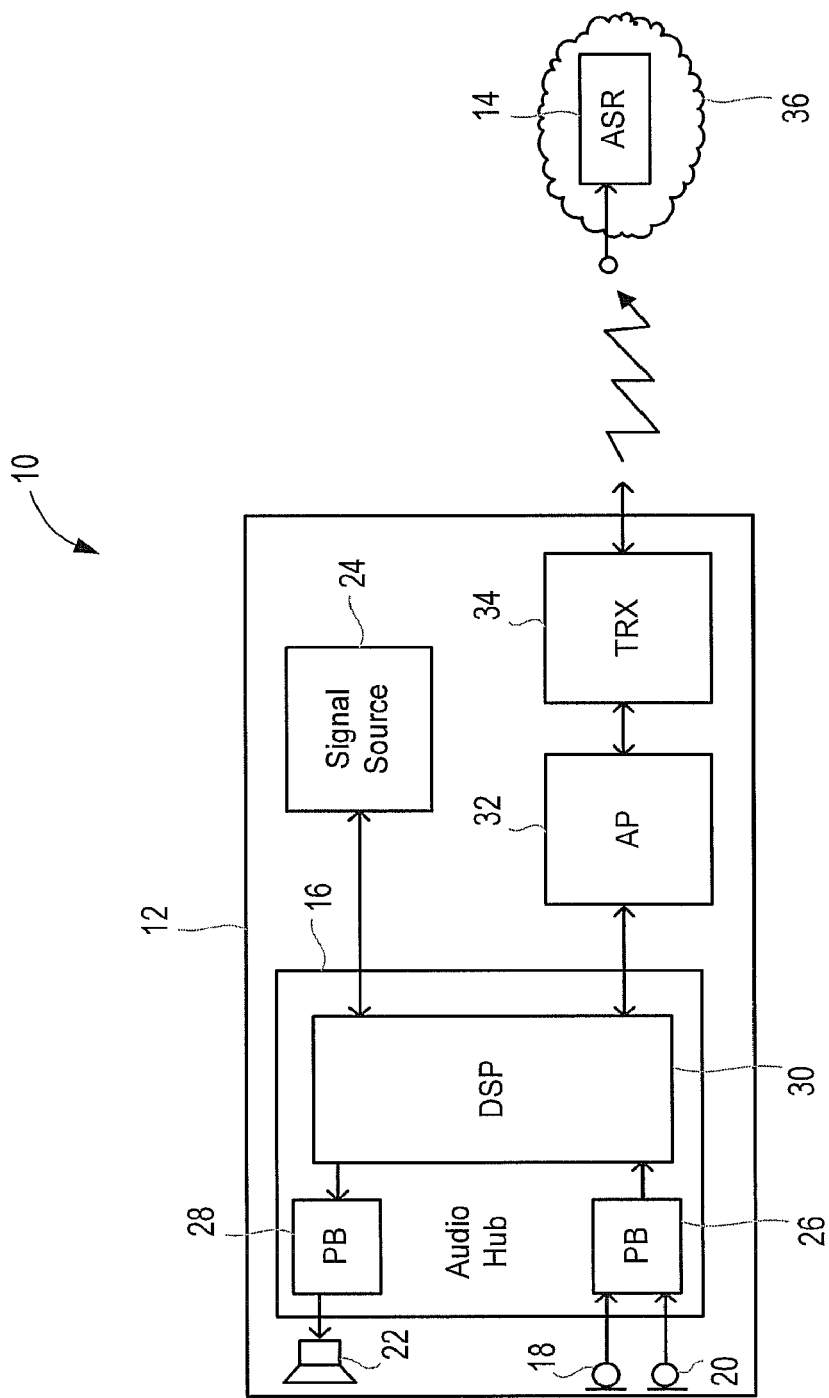
FIG. 1 shows a mobile device in accordance with an aspect of the present invention.

FIG. 1 shows a system 10, including a mobile communications device 12 having a connection to a server 14. In one embodiment, the server 14 may, for example, include a speech recognition engine, but it will be appreciated that other types of speech processor may be applied in other situations. In this illustrated embodiment, the mobile device 12 is connected to a server 14 in a wide area network 36 via an air interface, although it will be appreciated that other suitable connections, whether wired or wireless, may be used, or that the processing otherwise carried out by the server 14 may be carried out either partly or wholly within the mobile device 12. The mobile device 12 may be a smartphone or any other portable communications device having any of the functions thereof, such as a portable computer, games console, or a smart watch or other wearable device, or the like.

In the illustrated system, the mobile device 12 contains an audio hub integrated circuit 16. The audio hub 16 receives signals from one or more microphones 18, 20 and outputs signals through at least one speaker, i.e. audio output transducer, 22. In this figure there are two microphones 18, 20 although it will be appreciated that there may be only one microphone, or that there may be more microphones. The audio hub 16 also receives signals from a signal source 24, such as a memory for storing recorded sounds or a radio receiver, which provides signals when the mobile device is in a media playback mode. These signals are passed on to the audio hub 16 to be output through the speaker 22.

In the illustrated example, the audio hub 16 contains two processing blocks (PB) 26, 28 and a digital signal processor (DSP) 30. The first processing block 26 processes the analogue signals received from the microphones 18, 20, and outputs digital signals suitable for further processing in the DSP 30. The second processing block 28 processes the digital signals output by the DSP 30, and outputs signal suitable for inputting into the speaker 22.

The DSP 30 is further connected to an applications processor (AP) 32. This application processor performs various functions in the mobile device 12, including sending signals through a wireless transceiver 34 over the wide area network 36, including to the server 14.

It will be appreciated that many other architectures are possible, in which received speech data can be processed as described below.

The intention is that a user will issue speech commands that are detected by the microphones 18, 20 and the respective speech data output by these microphones is processed by the DSP 30. The processed signal(s) may then be transmitted to the server 14 which may, for example, comprise a speech recognition engine. An output signal may be produced by the server 14, perhaps giving a response to a question asked by the user in the initial speech command. This output signal may be transmitted back to the mobile device, through the transceiver (TRX) 34, and processed by the digital signal processor 30 to be output through the speaker 22 to be heard by the user. It will be appreciated that another user interface other than the speaker may be used to output the return signal from the server 14, for example a headset or a haptic transducer, or a display screen.

It will be appreciated that although in the preferred embodiment the applications processor (AP) 32 transmits the data to a remotely located server 14, in some embodiments the speech recognition processes may take place within the device 12, for example within the applications processor 32.

Figure 2:
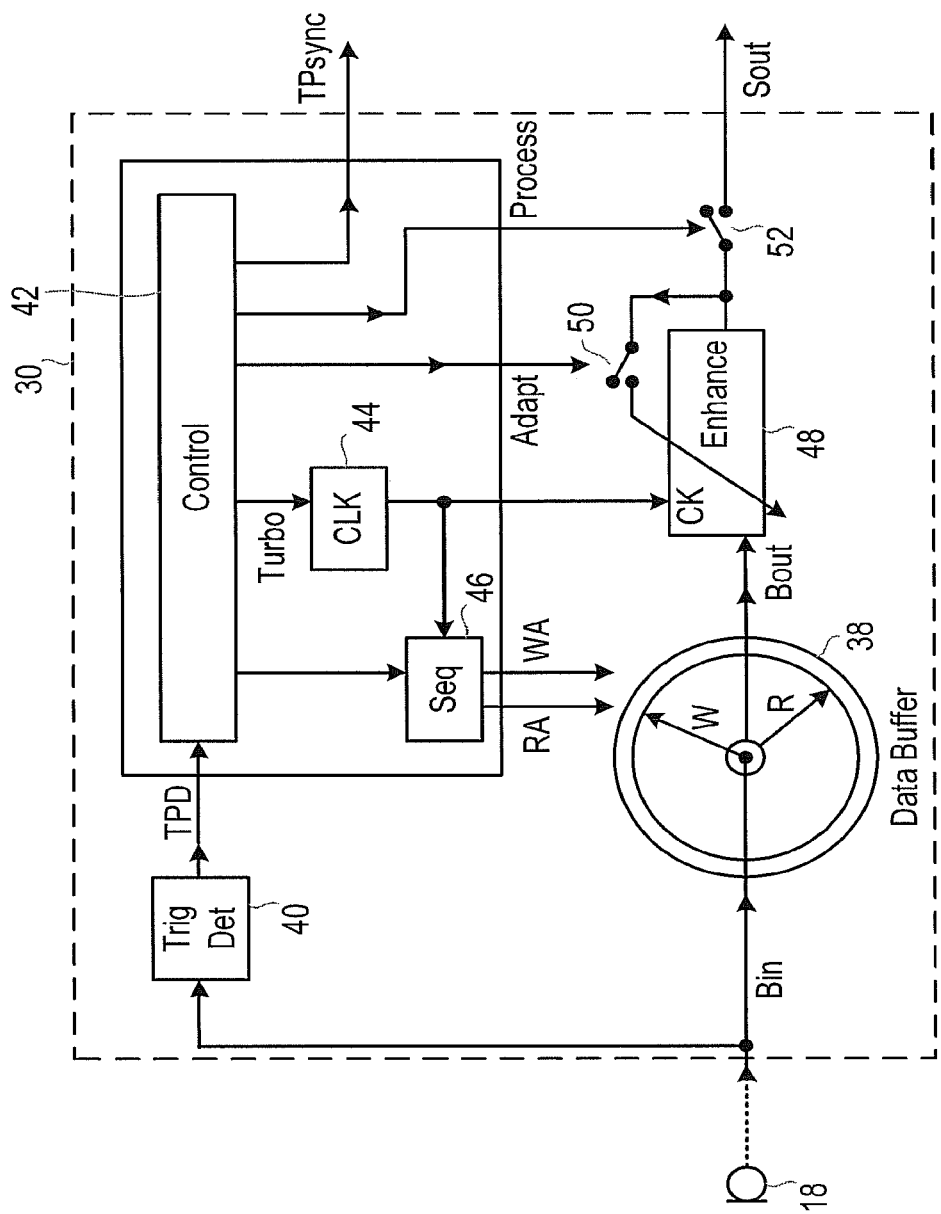
FIG. 2 shows a more detailed view of one embodiment of the digital signal processor in the mobile device of FIG. 1.

FIG. 2 shows a more detailed functional block diagram of the DSP 30. It will be appreciated that the functions described here as being performed by the DSP 30 might be carried out by hardware, software, or by a suitable combination of both. The signal Bin derived from the signal generated by the microphone 18 is sent to a buffer 38, which may for example take the form of a circular buffer having an area of memory to which data is written, with that data being overwritten when the memory is full. Although only one microphone is shown in this figure it will be appreciated that more than one microphone can be used.

As shown in FIG. 2, data is written to the buffer at a memory location indicated by a write pointer W, and data is read from the buffer at a memory location indicated by a read pointer R.

The microphone signal Bin is also sent to a low-power trigger detection block 40, which detects whether or not the signal contains data representing a spoken trigger phrase.

All input data might be sent to the data buffer 38 and the trigger detection block 40, or a signal activity detection block (not illustrated) might be provided, such that data is sent to the buffer 38 and the trigger detection block 40 only when it is determined that the input signal contains some minimal signal activity. In other words, in some embodiments a signal activity detection (SAD) block may cause both the buffer and the trigger detection (TD) block to be deactivated unless at least some minimal signal activity in the input signal is detected. In some embodiments a signal activity detection block may cause the trigger detection block to be deactivated unless at least some minimal signal activity in the input signal is detected, but to keep the buffer active to continuously buffer the input signal. Continuously buffering the input signal may allow input signal data arriving during the response time of the signal activity detector to be saved for later use, e.g. to allow trigger phrase detection to use even this earliest data.

A control block 42 receives an output signal TPD from the trigger detection block 40, in response to a determination that the signal contains data representing the spoken trigger phrase.

Thus, the overall power consumption can be minimised by maintaining much of the speech processing in a low power state, until such time as it is recognised by the trigger detection block 40 that the predefined trigger phrase has been spoken. In some embodiments a low power state may be achieved by disconnecting or disabling the power supply to relevant circuitry. In other embodiments a low power state may be achieved by disabling one or more clocks supplied to relevant circuitry. In other embodiments a low power state may be achieved by reducing the power supply voltage applied, or by reducing the frequency of one or more clocks supplied to relevant circuitry. In other embodiments a low power state may be achieved by not sequencing through some set of program instructions applied to processor circuitry. In a system with a plurality of microphones a low power state may be achieved by only processing signals from one of the microphones: this microphone may be designated in advance by prior design choice or may be selected on the basis of previous signal activity, e.g. whichever microphone was the last to go quiet, or was previously the loudest signal.

The control block 42 controls the operation of a clock controller 44, and also controls the respective sequential writing (WA) and reading (RA) of data to and from the buffer 38 via a buffer control block 46, as described in more detail below.

Data Bout that is read from the buffer 38 is passed to a speech enhancement block 48. As mentioned above, the speech enhancement block 48 may be maintained in a powered down state, until such time as it is activated by a signal from the clock controller 44, in response to a determination that the predefined trigger phrase has been spoken.

The speech enhancement block 48 may for example perform speech enhancement functions such as multi-microphone beamforming, spectral noise reduction, ambient noise reduction, or similar functionality, and may indeed perform multiple speech enhancement functions. The operation of the illustrated system is particularly advantageous when the speech enhancement block 48 performs at least one function that is adapted in response to the user's speech.

For example, in the case of a multi-microphone beamforming speech enhancement function, the enhancement takes the form of setting various parameters that are applied to the received signal Bout, in order to generate an enhanced output signal Sout. These parameters may define relative gains and delays to be applied to signals from one or more microphones in one or more frequency bands before or after combination to provide the enhanced output signal. The required values of these parameters will depend on the position of the person speaking in relation to the positions of the microphones, and so they can only be determined once the user starts speaking.

Thus, the enhancement block 48 is able to determine its operational parameters in an adaptive fashion, in order to optimise the enhancement, but this adaptation takes a finite time to reach the optimum state.

The control block 42 controls the operation of the adaptive functionality of the speech enhancement block 48. This is conceptually illustrated by a switch 50 shown as positioned to be able to interrupt any feedback and hence interrupt adaptation, though in practice other known methods of interrupting the adaptation may be used. For example, the adaptation may be interrupted by setting some adaptation coefficients to zero, or by interrupting the sequencing of some program code in processor circuitry. The output of the data Sout from the speech enhancement block 48 is controlled by the control block 42. This is conceptually illustrated by a second switch 52, though in practice the transmission may be interrupted by applying a control signal to some standard digital bus interface. A synchronization signal, TPsync, may be sent in parallel with, or embedded in the same channel as, the Sout data signal, as described in more detail below.

Figure 3:
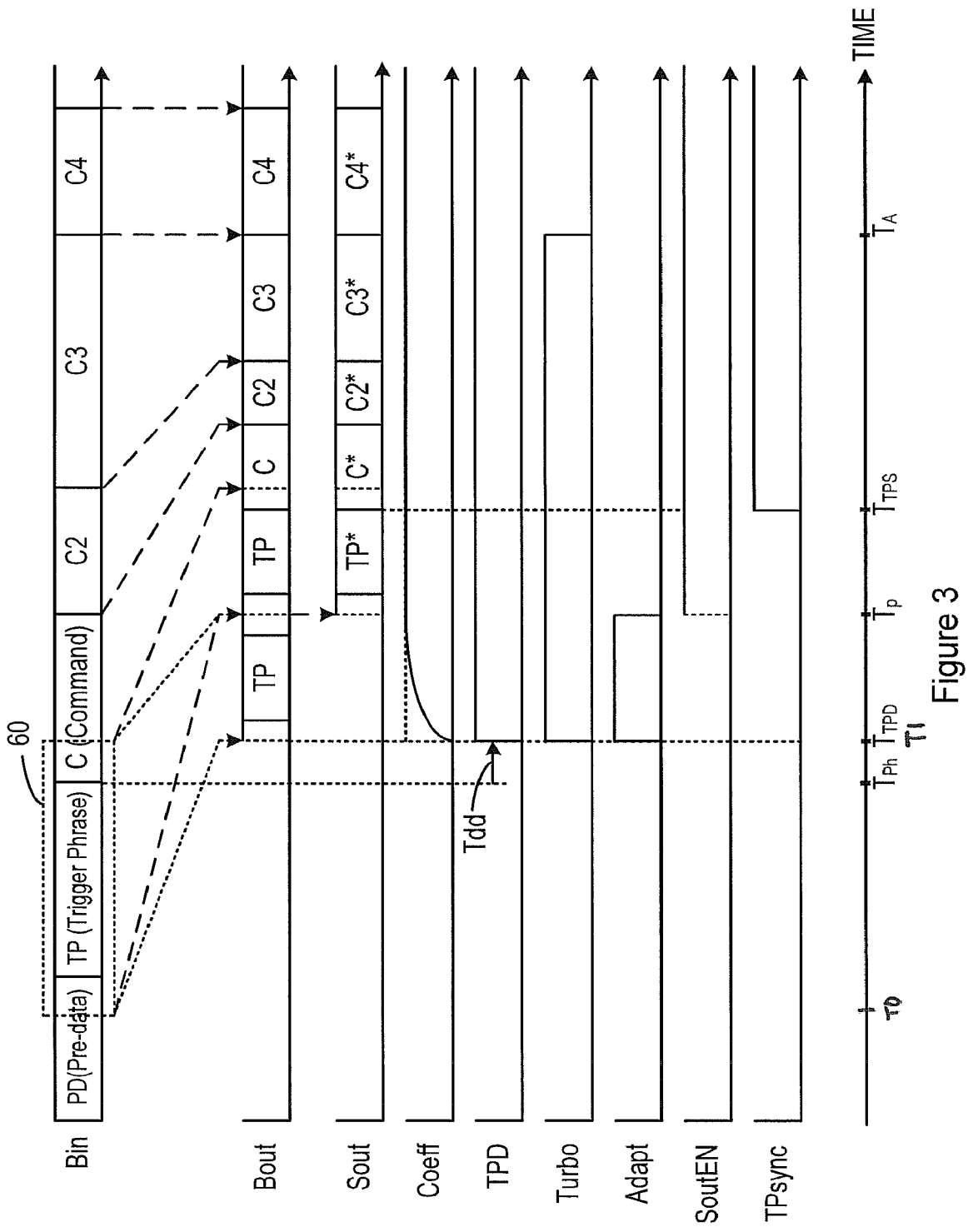
FIG. 3 shows an example of the operation of the system shown in FIG. 2.
Figure 4:
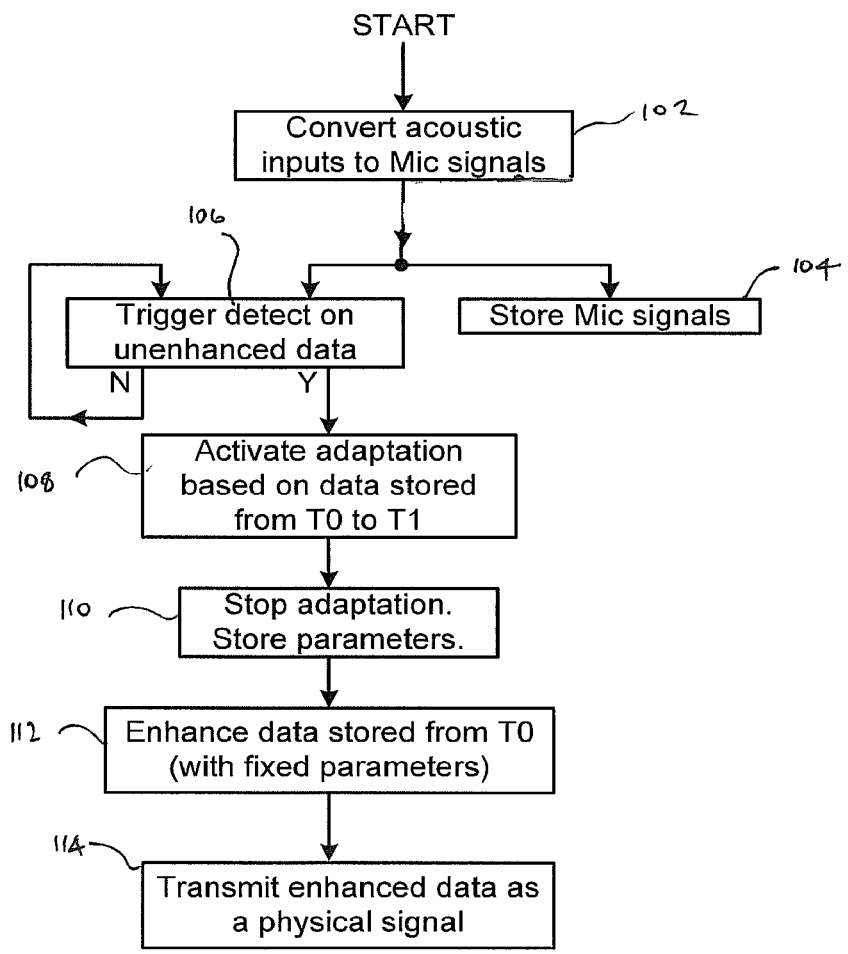
FIG. 4 is a flow chart, showing an example of the operation of the system shown in FIG. 2.

FIG. 3 and FIG. 4 show an example of the operation of the system shown in FIG. 2, with FIG. 3 showing a time history of various signals, and FIG. 4 being a flow chart. The process shown in FIG. 4 starts with step 102, in which the acoustic signals received at the or each microphone are converted into digital electrical signals representing the detected sounds. In step 104, these microphone signals are stored in the buffer 38. In FIG. 3, the axis labelled Bin shows the data received and written into the buffer 38 at any given time. The start of this writing of data to the buffer 38 may be activated by the level of sound being recorded by the microphone 18 increasing over a threshold value. In other embodiments the buffer 38 may be continuously writing. Over the course of the time shown in the figure the buffer 38 contains Pre-data (PD), which represents the data recorded by the buffer 38 before the user starts speaking the pre-defined trigger phrase, trigger phrase data (TP) and four command word data sections (C, C2, C3, C4). The end of the trigger phrase occurs at time $T_{ph}$.

In step 106 of the process of FIG. 4, the trigger phrase detection block 40 is continually attempting to detect the trigger phrase in the received microphone signals. The trigger phrase detection block 40 inevitably has a finite processing time, and so the trigger phrase is actually detected by the trigger detection block 40 at time $T_{TPD}$, a time interval Tdd after the end of the actual spoken trigger phrase at $T_{ph}$.

The detection of the trigger phrase initiates a number of processes. Firstly, the output of the buffer 38, Bout, is activated, and the read pointer R of the buffer 38 is set to read from a pre-determined number of data points back in time from the current position of the write arrow W. Thus, the output of the buffer is the data that was stored previously.

This pre-determined number of data points sets the start time T0 of a time period, from which the previously stored data is to be read out. The data that is read out is to be used in training the speech enhancement block 48, and so it is advantageous if the data that is read out includes all of the data representing the trigger phrase (shown as TP in the Bin line in FIG. 3). In practice, the exact duration of the trigger phrase will not be known in advance, and so FIG. 3 shows an example in which the write pointer W is set so that the data indicated by the dotted area 60 shown in FIG. 3 is read out, starting from the time T0 prior to the start of the actual trigger phrase TP. However, it will be appreciated that this pre-determined number of data points may be set so that the start of the data that is read out coincides exactly with the start of the data representing the trigger phrase, or so that the data that is read out may only start part way through the data representing the trigger phrase.

In the example illustrated in FIG. 3, the pre-determined number of data points ends at a time point T1 which is equal to $T_{TPD}$. In other words, the time period from which the previously stored data is read out for analysis ends immediately after the trigger phrase detection delay Tdd. In some embodiments this delay may be compensated for, so that the data to be analysed ends at a time point closer to the actual end of the detected trigger phrase $T_{Ph}$.

Secondly, as shown in step 108 of FIG. 4, the detection of the trigger phrase causes the control block 42 to send a command "Adapt", as shown in FIG. 3, to activate the switch 50. This "Adapt" command activates the enhancement block 48 to begin its adaptation. This means that the parameters of the enhancement block 48 are iteratively adapted such that they converge onto preferable values, as shown in FIG. 3 on the axis labelled Coeff. This process of adaptation, also referred to herein as "training" the enhancement block, is a process of optimising the coefficients of filters and other algorithm components based on the sampled audio data. This convergence usually requires input data spanning a period of time of the order of one second.

The detection of the trigger phrase also prompts the control block 42 to send a command Turbo to the clock controller 44. This command causes the clock controller 44 to generate a clock signal at a rate that is higher than the sample rate of the input data Bin. This causes the data to be read from the buffer 38 at a rate that is faster than real-time, that is, faster than the rate at which the data was written to the buffer 38. This may also reduce the actual time required for convergence of the adaptation.

From this point onwards, data is read continually from the buffer 38 (at least until it is determined that the user has stopped speaking). As can be seen from FIG. 3, the rate at which the buffer 38 is being read is kept higher than real-time until the read arrow R of the buffer 38 substantially catches up with the write arrow W at time $T_A$. This means that, by this time, the data being input into the buffer 38 is being output at essentially the same time. In the example shown in FIG. 3, this occurs at the same time as the transition between command words C3 and C4, but this is a coincidence and not necessary.

As mentioned above, the parameters or coefficients of the enhancement block 48 are adapted during the time that a part of the data, that was stored in the buffer 38 during the period before the trigger phrase was detected, is being read out. In the example shown in FIG. 3, the data that is read out includes all of the data up until the time $T_{TPD}$. However, it is also possible to stop reading out this data at an earlier point. For example, the duration of the data that is read out may be set based on an expectation of the time that will be taken for the parameters of the enhancement block 48 to converge on suitable values.

At the time when the selected data stored before the time $T_{TPD}$ has been read out, that is, at the time $T_P$, the command block 42 deactivates the switch 50, as shown in FIG. 3 on the axis labelled Adapt, and this has the effect of preventing further adaptation of the parameters of the enhancement block 48, as shown in step 110 of FIG. 4. The parameters values obtained during the adaptation are then stored. As an alternative, it is possible to control the adaptation of the enhancement block 48, so that the rate of convergence of the parameters is substantially reduced, say by a factor of ten or more (for example the step size of the adaptation may be reduced or the time constant of the adaptation process may be increased). In either case, this has the effect that there are no sudden changes in the parameters during use of the enhancement block 48, which might tend to have adverse effects on the quality of the output. A maximum permissible rate of change for the coefficients could be derived empirically from testing the sensitivity of the speech recognition function 14 to changes in the coefficients of the enhancement block 48.

At the time $T_P$, a command is also sent from the control block 42 to actuate the second switching means 52. This command process, shown on the axis SoutEN in FIG. 3, causes the enhancement block 48 to use the frozen, or only slowly converging, coefficients to process the data Bout in step 112 of the process shown in FIG. 4, and to output the processed (that is, enhanced) data, Sout. The enhanced data is transmitted as an output in step 114.

Also at the time $T_P$, the read arrow R is reset, so that the data that is read out after that point contains at least a part of the data that was read out before that point. Thus, there is an overlap between the data that is read from the buffer to train the speech enhancement block 48 before the time $T_P$ and the data that is read from the buffer for enhancement by the speech enhancement block after the time $T_P$.

In the example shown in FIG. 3, the read arrow R is reset to the same point that it was set at the time $T_{TPD}$, so that the data that is read out from the buffer 38 after the time $T_P$ contains all of the data, starting at the time T0, that was used to train the speech enhancement block 48. In this illustrated example, this data contains the whole of the trigger phrase TP. However, depending on the requirements of the speech recognition process, it may not be necessary for the data that is read out from the buffer 38 after the time $T_P$ to contain all of the data representing the trigger phrase TP, and so the read arrow R may be reset to any suitable data point.

As an alternative to resetting the read arrow R, some or all of the data that is read out of the buffer 38 during the training phase before the time $T_P$ may be temporarily stored in a cache, and then read out of the cache after the time $T_P$ to be passed through the speech enhancement block 48 for processing with the adapted parameters.

In either case, thereafter, the data from the buffer 38 is output again after the time $T_p$, still at a faster rate than real-time.

As shown in the line Bout in FIG. 3, the data that is read out thereafter is all of the data stored in the buffer 38, representing the trigger phrase TP (in this illustrated example) and the data representing the command words C, C2, C3, C4, after this data has passed through the speech enhancement block 48 to generate modified data TP*, C*, C2*, C3*, C4*.

The control block 42 may also determine the point at which the trigger phrase TP ends and the first command word C starts, in which case it may generate a synchronization signal, TPsync, to be sent by the control block 42 at the time $T_{TPS}$, at the time at which it determines that the trigger phrase has been processed by the enhancement block 48, and hence that the modified data C* representing the first command word is about to start.

Thus, as can be seen from FIG. 3, on the axis labelled Sout, the data output from the DSP 30 being the processed trigger phrase data (TP*) and the four processed command word data sections (C*, C2*, C3* and C4*). This outputted data is therefore processed such that it can be recognised by a speech recognition engine, or any other speech processor.

Figure 5:
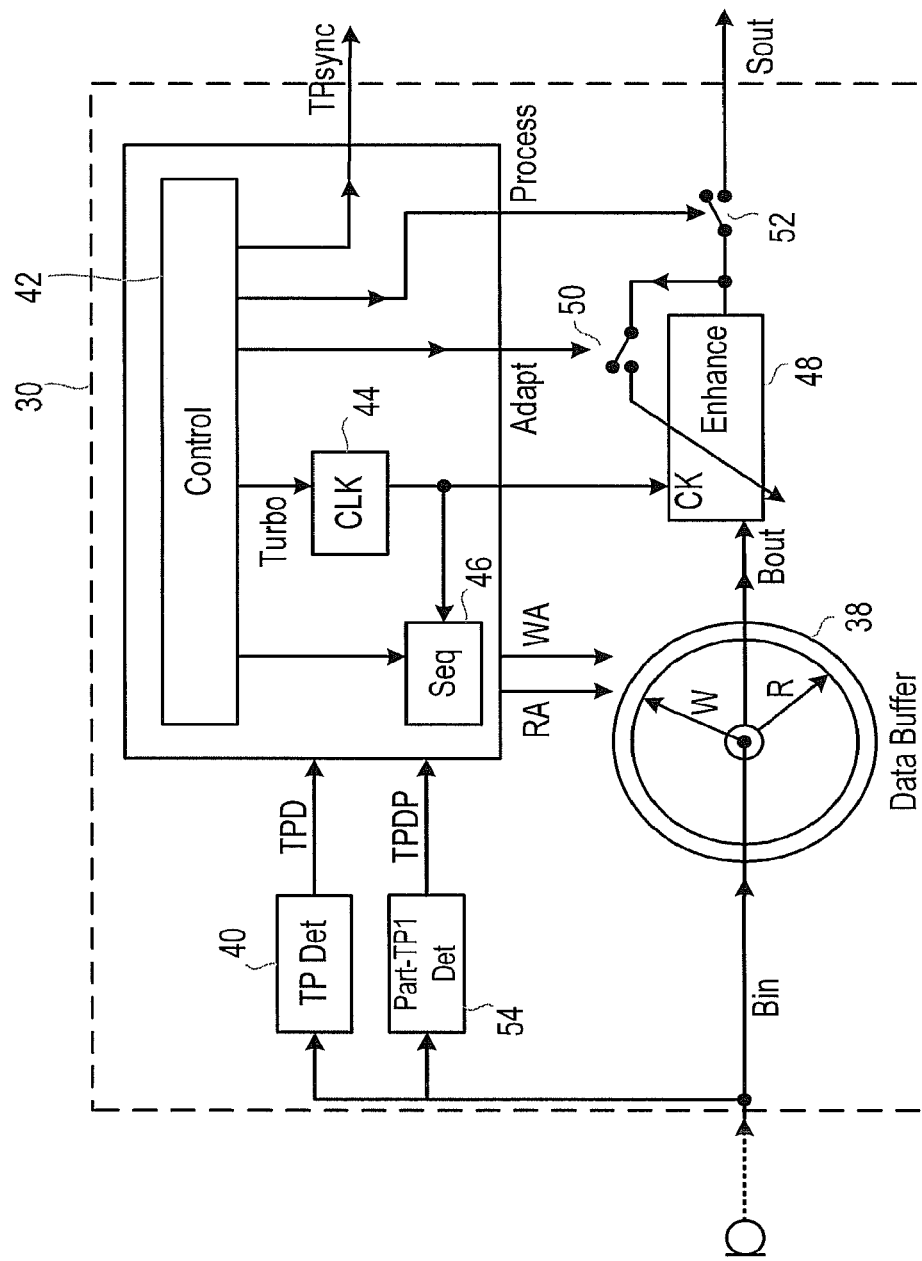
FIG. 5 shows an alternative embodiment of the digital signal processor.

FIG. 5 shows a further embodiment of the system of the DSP 30 in FIG. 1. The DSP 30 shown in FIG. 5 corresponds in large part to the DSP 30 shown in FIG. 2, and corresponding features in these two figures are indicated by the same reference numerals and will not be described further herein.

In FIG. 5, the input signal Bin, obtained directly or indirectly from the microphone or microphones is passed to the circular buffer 38, to the trigger detection block 40, and to a partial trigger detection block 54.

As discussed with reference to FIG. 2, all input data might be sent to the buffer 38, the trigger detection block 40, and the partial trigger detection block 54, or an activity detection block might be provided, such that data is sent to the buffer 38, the trigger detection block 40, and the partial trigger detection block 54, only when it is determined that the input signal contains some minimal signal activity. In other words, in some embodiments a signal activity detection block may cause both the buffer and the trigger detection block to be deactivated unless at least some minimal signal activity in the input signal is detected. In some embodiments a signal activity detection block may cause the trigger detection block to be deactivated unless at least some minimal signal activity in the input signal is detected, but to keep the buffer active to continuously buffer the input signal. Continuously buffering the input signal may allow input signal data arriving during the response time of the signal activity detector to be saved for later use, e.g. to allow trigger phrase detection to use even this earliest data.

The partial trigger detection block 54 detects whether or not the received signal contains data representing a selected part of the spoken trigger phrase, i.e. a partial trigger phrase, which can be considered to be a first trigger phrase. For example, the selected part of the trigger phrase will typically be the first part of the trigger phrase that is detected by the trigger detection block 40. On detection of the first trigger phrase, i.e. the selected part of the spoken trigger phrase, the partial trigger detection block 54 sends an output signal TPDP to the control block 42.

Figure 6:
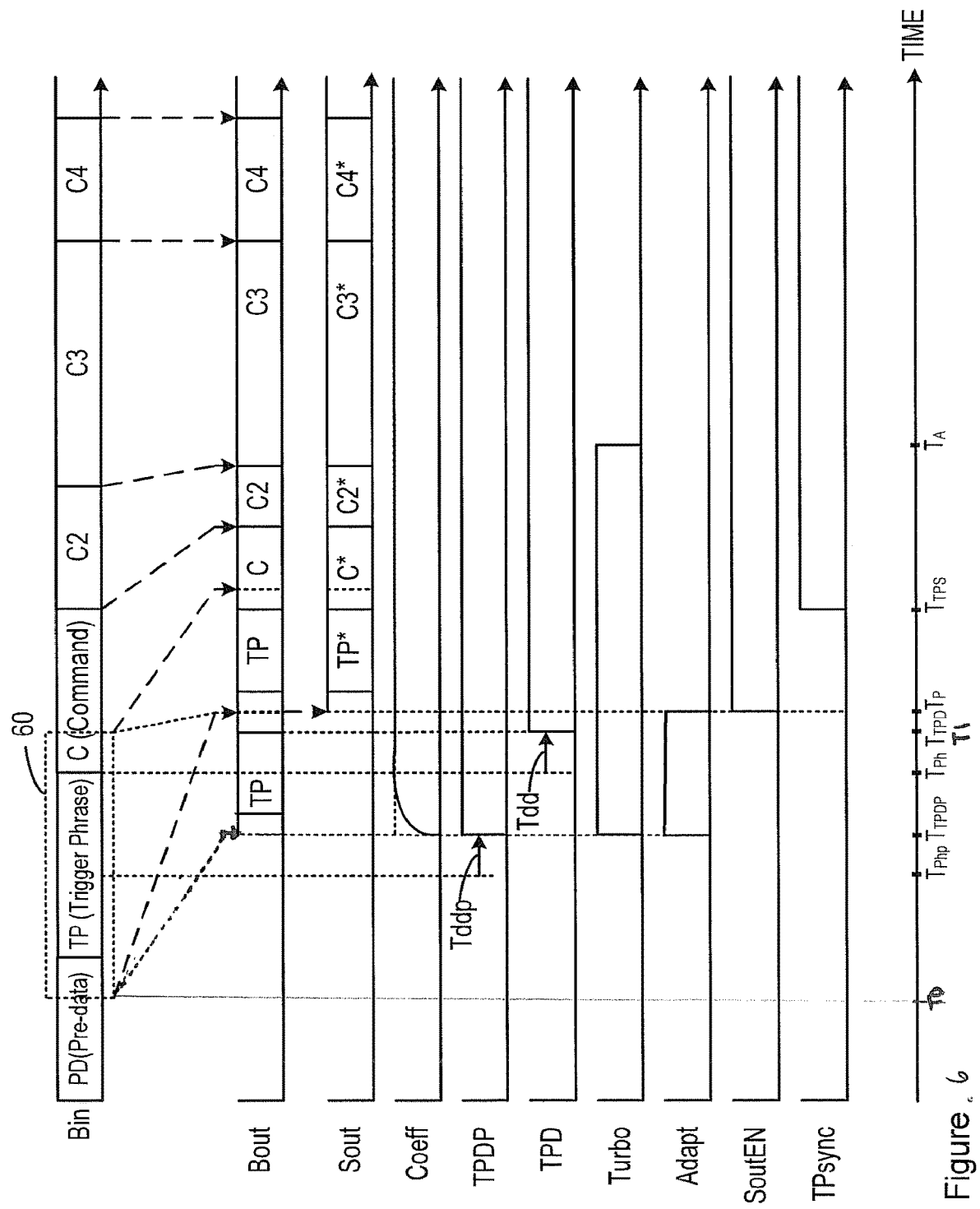
FIG. 6 shows an example of the operation of the system shown in FIG. 5.
Figure 7:
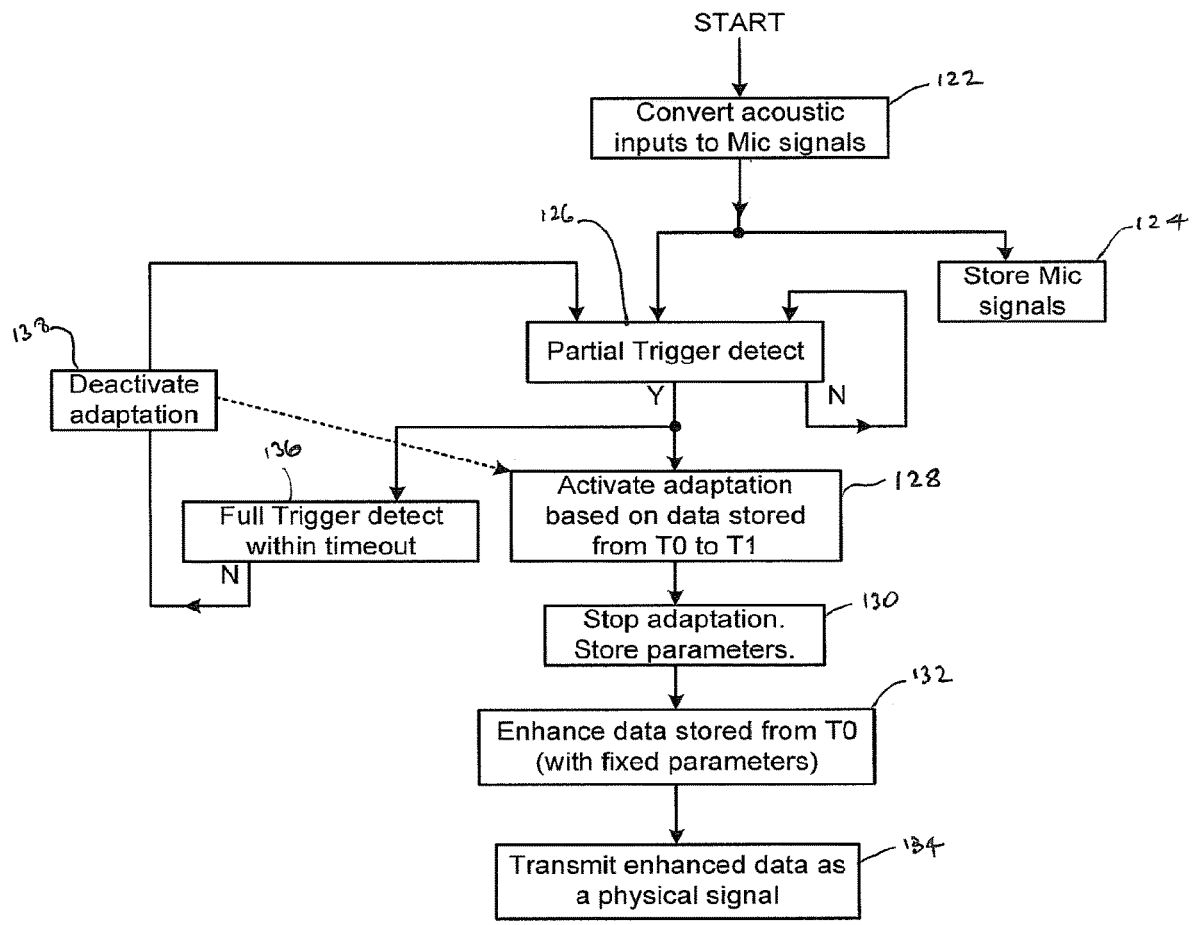
FIG. 7 is a flow chart, showing an example of the operation of the system shown in FIG. 5.

FIG. 6 shows an example of the operation of the system shown in FIG. 4, and FIG. 7 is a flow chart showing the process performed. The process shown in FIG. 7 starts with step 122, in which the acoustic signals received at the or each microphone are converted into digital electrical signals representing the detected sounds. In step 124, these microphone signals are stored in the buffer 38. The axis labelled Bin in FIG. 6 shows the data received and written into the buffer 38 at any given time. The start of this writing of data to the buffer 38 may be activated by the level of sound being recorded by the microphone 18 increasing over a threshold value. In other embodiments the buffer 38 may be continuously writing. Over the course of the time shown in the figure the buffer 38 contains Pre-data (PD), which represents the data recorded by the buffer 38 before the user starts speaking the predefined trigger phrase, trigger phrase data (TP) and four command word data sections (C, C2, C3, C4).

As shown in step 126 of FIG. 7, the partial trigger detection block 54 is continually attempting to detect a selected part of the trigger phrase in the received signals. In this example, the selected part of the trigger phrase is the first part of the trigger phrase, and the end of the selected part of the trigger phrase occurs at time $T_{php}$ although in other embodiments the selected part of the trigger phrase may for example occur in the middle of the trigger phrase. The partial trigger detection block 54 inevitably has a finite processing time, and so the end of the selected part of the trigger phrase is actually detected by the partial trigger detection block 54 at time $T_{TPDP}$, a time interval Tddp after the end of the data representing the selected part of the trigger phrase at $T_{Php}$.

The detection of the selected part of the trigger phrase initiates a number of processes. Firstly, the output of the buffer 38, Bout, is activated, and the read pointer R of the buffer 38 is set to read from a pre-determined number of data points back in time from the current position of the write arrow W. Thus, the output of the buffer is the data that was stored previously.

This pre-determined number of data points sets the time period, starting at a time T0, from which the previously stored data is to be read out. The data that is read out is to be used in training the speech enhancement block 48, and so it is advantageous if the data that is read out includes all of the data representing the trigger phrase (shown as TP in the Bin line in FIG. 6). In practice, the exact duration of the trigger phrase will not be known in advance, and so FIG. 6 shows an example in which the write pointer W is set so that the data indicated by the dotted area 60 shown in FIG. 6 is read out starting from a time T0 prior to the start of the actual trigger phrase TP. However, it will be appreciated that this pre-determined number of data points may be set so that the start of the data that is read out coincides exactly with the start of the data representing the trigger phrase, or so that the data that is read out may only start part way through the data representing the trigger phrase.

In the example illustrated in FIG. 6, the pre-determined number of data points ends at a time point T1 which is equal to $T_{TPD}$. In other words, the time period from which the previously stored data is read out for analysis ends immediately after the trigger phrase detection delay Tdd. In some embodiments this delay may be compensated for, so that the data to be analysed ends at a time point closer to the actual end of the detected trigger phrase $T_{Ph}$.

Secondly, the detection of the partial trigger phrase causes the control block 42 to send a command Adapt, as shown in FIG. 6, to activate the switching means 50. Thus, in step 128 of the process shown in FIG. 7, this command activates the enhancement block 48 to begin its adaptation. This means that the parameters of the enhancement block 48 are iteratively adapted such that they converge onto preferable values, as shown in FIG. 5 on the axis labelled Coeff. This process of adaptation, also referred to herein as "training" the enhancement block, is a process of optimising the coefficients of filters and other algorithm components based on the sampled audio data. This convergence usually takes a period of input data spanning a time of the order of one second.

The detection of the partial trigger phrase also prompts the control block 42 to send a command Turbo to the clock controller 44. This "Turbo" command causes the clock controller 44 to generate a clock signal at a clock rate that is higher than the sample clock rate of the input data Bin. This causes the data to be read from the buffer 38 at a clock rate that is faster than real-time, that is, faster than the clock rate at which the data was written to the buffer 38. This may also reduce the actual time required for convergence of the adaptation.

From this point onwards, data is read continually from the buffer 38 (at least until it is determined that the user has stopped speaking). As can be seen from FIG. 6, the rate at which the buffer 38 is being read is kept higher than real-time until the read arrow R of the buffer 38 substantially catches up with the write arrow W at time $T_{T4}$. This means that, by this time, the data being input into the buffer 38 is being output at essentially the same time.

The end of the whole trigger phrase occurs at time $T_{ph}$. The trigger detection block 40 has a finite processing time, and so the end of the whole trigger phrase is actually detected by the trigger detection block 40 at time $T_{TPD}$, a time interval Tdd after the end of the data representing the selected part of the trigger phrase at $T_{ph}$.

As mentioned above, the parameters or coefficients of the enhancement block 48 are adapted during the time that a part of the data, that was stored in the buffer 38 during the period before the trigger phrase was detected, is being read out. In the example shown in FIG. 6, the data that is read out includes all of the data up until the time $T_{TPD}$. However, it is also possible to stop reading out this data at an earlier point. For example, the duration of the data that is read out may be set based on an expectation of the time that will be taken for the parameters of the enhancement block 48 to converge on suitable values.

At the time when the selected data stored before the time $T_{TPD}$ has been read out, that is, at the time $T_P$, the command block 42 deactivates the switch 50, as shown in FIG. 6 on the axis labelled Adapt, and this has the effect of preventing further adaptation of the parameters of the enhancement block 48, as shown in step 130 of FIG. 7. The adapted parameters are then stored for further use. As an alternative, it is possible to control the adaptation of the enhancement block 48, so that the rate of convergence of the parameters is substantially reduced. In either case, this has the effect that there are no sudden changes in the parameters during use of the enhancement block 48, which might tend to have adverse effects on the quality of the output. A maximum permissible rate of change for the coefficients could be derived empirically from testing the sensitivity of the speech recognition function 14 to changes in the coefficients of the enhancement block 48.

At the time $T_P$, a command is also sent from the control block 42 to actuate the second switch 52. This command process, shown on the axis SoutEN in FIG. 3, causes the enhancement block 48 to use the frozen, or only slightly converging, coefficients to process the data Bout and output the processed data, Sout.

Also at the time $T_P$, the read arrow R is reset, so that the data that is read out after that point contains at least a part of the data that was read out before that point. Thus, there is an overlap between the data that was read from the buffer and used to train the speech enhancement block 48 before the time $T_P$ and the data that is read from the buffer after the time $T_P$ for enhancement by the speech enhancement block. In the example shown in FIG. 6, and as shown in step 132 of FIG. 7, the read arrow R is reset to the time point T0, which is the same point that it was set at the time $T_{TPD}$, so that the data that is read out from the buffer 38 after the time $T_P$ contains all of the data that was used to train the speech enhancement block 48. In this illustrated example, this data contains the whole of the trigger phrase TP. However, depending on the requirements of the speech recognition process, it may not be necessary for the data that is read out from the buffer 38 after the time $T_P$ to contain all of the data representing the trigger phrase TP, and so the read arrow R can be reset to any suitable data point.

Thereafter, the data from the buffer 38 is output again after the time $T_p$, still at a faster rate than real-time.

As shown in the line Bout in FIG. 6, the data that is read out thereafter is all of the data stored in the buffer 38, representing the trigger phrase TP (in this illustrated example) and the data representing the command words C, C2, C3, C4, after this data has passed through the speech enhancement block 48 to generate modified data TP*, C*, C2*, C3*, C4*.

In step 134 of FIG. 7, this enhanced data Sout is transmitted as an output.

The control block 42 may also determine the point at which the trigger phrase TP ends and the first command word C starts, in which case it may generate a synchronization signal, TPsync, to be sent by the control block 42 at the time $T_{TPS}$, at the time at which it determines that the trigger phrase has been processed by the enhancement block 48, and hence that the modified data C* representing the first command word is about to start.

Thus, as can be seen from FIG. 6, on the axis labelled Sout, the data output from the DSP 30 being the processed trigger phrase data (TP*) and the four processed command word data sections (C*, C2*, C3* and C4*). This outputted data is therefore processed such that it can be more easily or more accurately recognised by a speech recognition engine, or any other speech processor.

Thus, in the embodiment shown in FIG. 5 and described with reference to FIGS. 6 and 7, the adaptation of the parameters of the enhancement block 48 starts earlier than in the embodiment shown in FIG. 2 and described with reference to FIGS. 3 and 4. Thus, it is possible to start sending the enhanced speech data earlier, reducing any processing delay in the speech recognition system.

Of course, it is possible that the received data may contain data representing the selected, first part of the trigger phrase without containing data representing the whole trigger phrase. (The user may say a phrase that does not contain the trigger phrase, but that coincidentally does include the selected, first, part of the trigger phrase.) Therefore, when the control block 42 receives the signal TPDP indicating that the selected part of the trigger phrase has been detected, it monitors for the arrival of the signal TPD indicating that the whole trigger phrase has been detected. If the signal TPD is not generated within a preset time from the arrival of the signal TPDP, a reset signal can be generated, so that the adaptation of the parameters of the enhancement block 48 is stopped, and no data is output from the enhancement block. In some embodiments the trigger phrase detector may be able to deduce that the received data does not contain the full trigger word before this timeout has elapsed and there may be a signal path (not illustrated) by which the trigger phrase detector may communicate this to the control block which may then immediately de-activate the enhancement processing.

Confirmation of the reception of the full trigger phrase may also be used to power up other parts of the circuitry or device, for instance to activate other processor cores or enable a display screen. Also in some embodiments a local processor, for example the applications processor, may be used to perform some of the ASR functionality, so signal TPD may be used to activate associated parts of the processor or to load appropriate software onto it.

Figure 8:
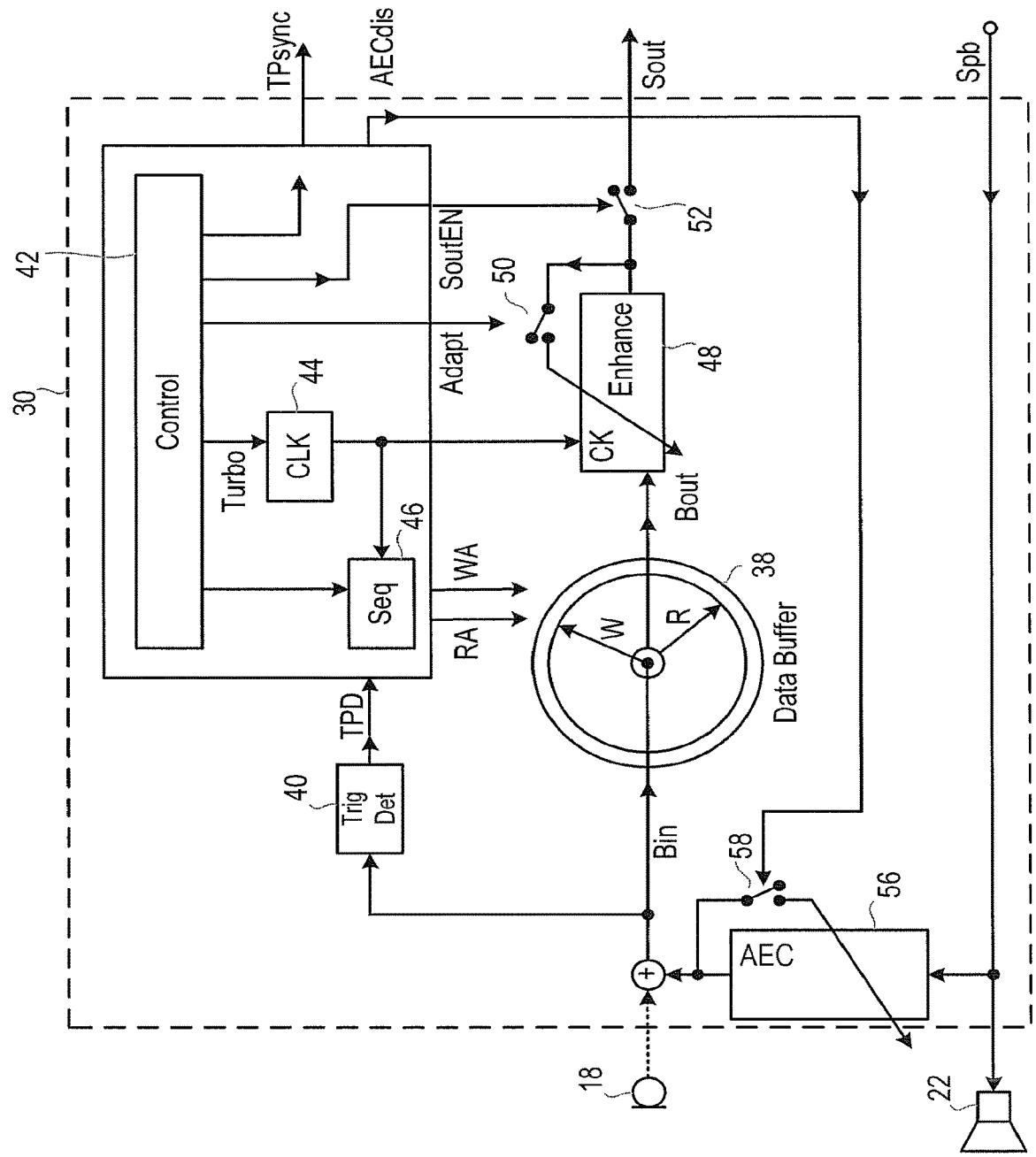
FIG. 8 shows a further alternative embodiment of the digital signal processor.

FIG. 8 shows a further embodiment of the system of the DSP 30 in FIG. 1. The DSP 30 shown in FIG. 8 corresponds in large part to the DSP 30 shown in FIG. 2, and corresponding features in these two figures are indicated by the same reference numerals and will not be described further herein.

Thus, as in FIG. 2, a signal from one or more microphone 18 is sent to a buffer 38, and to a trigger detection block 40, which detects whether or not the signal contains data representing a spoken trigger phrase. A control block 42 receives the output signal, TPD, from the trigger detection block 40 and, in response to that signal, controls a clock 44, and the sequential reading and writing of the buffer 38 via a buffer control block 46. The read output of the buffer 38, Bout, is passed to a speech enhancement block 48. The adaptive functionality of the speech enhancement block 48 is controlled by a switching means 50, which is actuated by the control block 42. The rate of the processing occurring in the enhancement block 48 is controlled by the output from the clock 44. The output of the speech enhancement block, Sout, is controlled by a second switching means 52, which is also actuated by the control block 42. A synchronization signal, TPsync, may be sent in parallel with, or embedded in the same channel as, the Sout data signal.

In the embodiment shown in FIG. 8, the system is particularly suitable for use in a device including a media playback source such as the signal source 24 depicted in FIG. 1. A signal Spb from the signal source 24 is applied to the speaker 22 to generate sounds for the listener's attention. The DSP 30 also includes an acoustic echo cancellation (AEC) block 56 connected to receive the signal Spb, and adapted to generate an echo cancellation signal, which is intended to be added to the signal input from the microphone in order to cancel any echo component therein. It is the resulting signal which is used as the input Bin as described above.

The AEC block 56 is adaptive, and so its parameters are adjusted in response to the signal that it receives. However, in this illustrated embodiment, a disable signal "AECdis" is generated by the control block 42, during the initial adaptation of the enhancement processing block 48, or while enhanced data is being output from the enhancement processing block 48, or both.

While the disable signal AECdis is active, a switch 58 is opened, and so the adaptation of the acoustic echo cancellation block 56 is prevented or slowed while the enhancement block 48 is adapting to the Bout signal and/or processing it. This still allows acoustic echo cancellation to be performed by the AEC block 56, but it pauses the adaption of the parameters of the block to the acoustic environment. This has the advantage that it avoids any artefacts in the speech path which may be caused by the AEC block 56 undergoing adaption.

It will be appreciated that this embodiment may also include the presence of a partial trigger detection block 54, functioning in much the same way as described in relation to FIGS. 5, 6 and 7.

Figure 9:
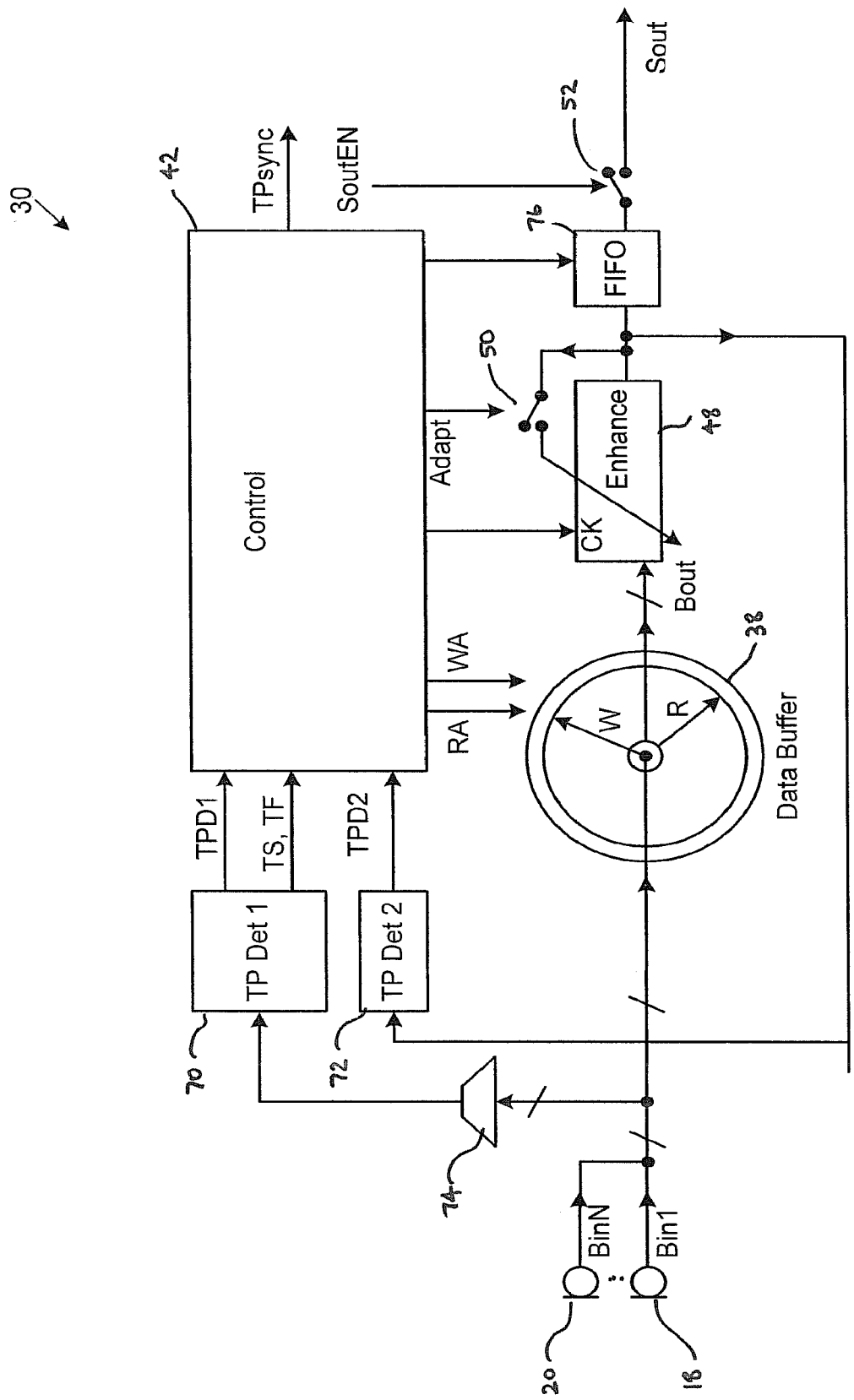
FIG. 9 shows an alternative embodiment of the digital signal processor.

FIG. 9 shows a further embodiment of the system of the DSP 30 in FIG. 1. The DSP 30 shown in FIG. 9 corresponds in large part to the DSP 30 shown in FIG. 5, and corresponding features in these two figures are indicated by the same reference numerals and will not be described further herein.

As shown in FIG. 9, the DSP 30 is particularly useful for a situation in which there are multiple microphones 18, 20, producing, directly or indirectly, respective input signals Bin1, . . . , BinN, and these are passed to the circular buffer 38, to a first trigger detection block 70, and to a second trigger detection block 72.

As discussed with reference to FIG. 2, input data might be sent continually to the buffer 38, the first trigger detection block 70, and the second trigger detection block 72, or an activity detection block might be provided, such that data is sent to or accepted by or processed by the buffer 38, the first trigger detection block 70, and the second trigger detection block 72, only when it is determined that the input signal contains some minimal signal activity. In other words, in some embodiments a signal activity detection block (not illustrated) may cause both the buffer and the trigger detection block to be deactivated unless at least some minimal signal activity in the input signal is detected. In some embodiments a signal activity detection block may cause the trigger detection block to be deactivated unless at least some minimal signal activity in the input signal is detected, but to keep the buffer active to continuously buffer the input signal. Continuously buffering the input signal may allow input signal data arriving during the response time of the signal activity detector to be saved for later use, e.g. to allow trigger phrase detection to use even this earliest data.

The first trigger detection block 70 detects whether or not the received signal contains data representing a spoken trigger phrase, using relatively loose detection criteria, meaning that the first trigger detection block 70 has a very high probability of recognising the trigger phrase in the data, but with a correspondingly higher risk of a false positive (that is detecting the presence of a trigger phrase that was not in fact spoken). The second trigger detection block 72 also detects whether or not the received signal contains data representing a spoken trigger phrase, but using relatively tight detection criteria, meaning that the second trigger detection block 70 has a lower risk of producing a false positive detection. The first trigger detection block may be less complex than the second trigger detection block, and may therefore consume less power and/or be less computationally intensive when active. The second trigger detection block may be activated only after the first trigger detection block has detected a likely trigger phrase.

The signals Bin1, . . . , BinN from all of the microphones may be passed to the first trigger detection block 70, but it may be preferable to select only one of the microphones 18, 20, and to supply only the corresponding input signal to the first trigger detection block 70. The microphone to be selected may be designated in advance and either hard-wired or passed through a selector 74 with fixed control input values. Alternatively the microphone may be chosen in use, by some additional circuitry not illustrated, for example the microphone which previously received the loudest voice input, or (by means of some low frequency polling) the one recently receiving the most signal activity, or on the basis of the orientation of the host device as detected by some other sensor.

In this illustrated embodiment, the speech enhancement block 48 takes the form of a beamformer, which receives data from multiple microphone sources (which may advantageously be at least somewhat directional, and located on the host device such that they detect sounds from different directions), and generates an output signal in the form of a selection and/or combination of the input signals. The output signal may for example be obtained from the input signals by applying different weightings and phasings to the input signals. Thus, in moderately noisy environments, the output signal can emphasise the signal from one or more microphone that is directed generally towards the speaker, and can suppress the signal from one or more microphone that is directed towards a source of background noise, in order to produce an output signal that has a higher signal to noise ratio than would be achievable using any single one of the microphones alone. The beamformer may also apply relative time delays to signals received from microphone sources. Signals from sound sources which are oriented such that the acoustic signals arrive at the separate microphones with a certain relative time delay will reinforce when a compensating time delay is applied and the signals then added. Signals from sound sources which are oriented such that the acoustic signals arrive at the separate microphones in anti-phase with a certain time delay will cancel when a compensating time delay is applied and the signals then added, thus providing a null response to sound sources so oriented. For example, signals from two or more microphones on the front face of a mobile phone may be added to provide peak response orthogonal to the front face of the phone, in the direction where a user's voice is likely to come from when looking at the phone, and to provide nulls at an angle to the face of the phone where background noise may come from behind the user's head. By altering the relative delay applied to these microphone signals the direction of peak response may be adjusted to align better with the user's actual orientation.

This adjustment may require adaptation on the basis of the signals actually received during a time span of possibly a second or so before the value of the adapted delay is satisfactorily converged. For systems with more microphones the relative delay and weighting of each may be adapted. In some embodiments, some or all of the microphones may be designed with a deliberate directionality to supplement the directionality provided by the digital processing in order to aid reception of sounds from anticipated directions. This process of adaptation, also referred to herein as "training" the enhancement block, is a process of optimising the coefficients of filters and other algorithm components based on the sampled audio data. In the case of an enhancement block in the form of a beamformer, the training or adaptation configures the directionality of the beamformer for example. By training the algorithm using audio data from multiple microphones, it is possible to identify speech sources and to configure the beamformer's filters such that they enhance audio content from the direction of the loudest speech source and attenuate audio from other sources.

Figure 10:
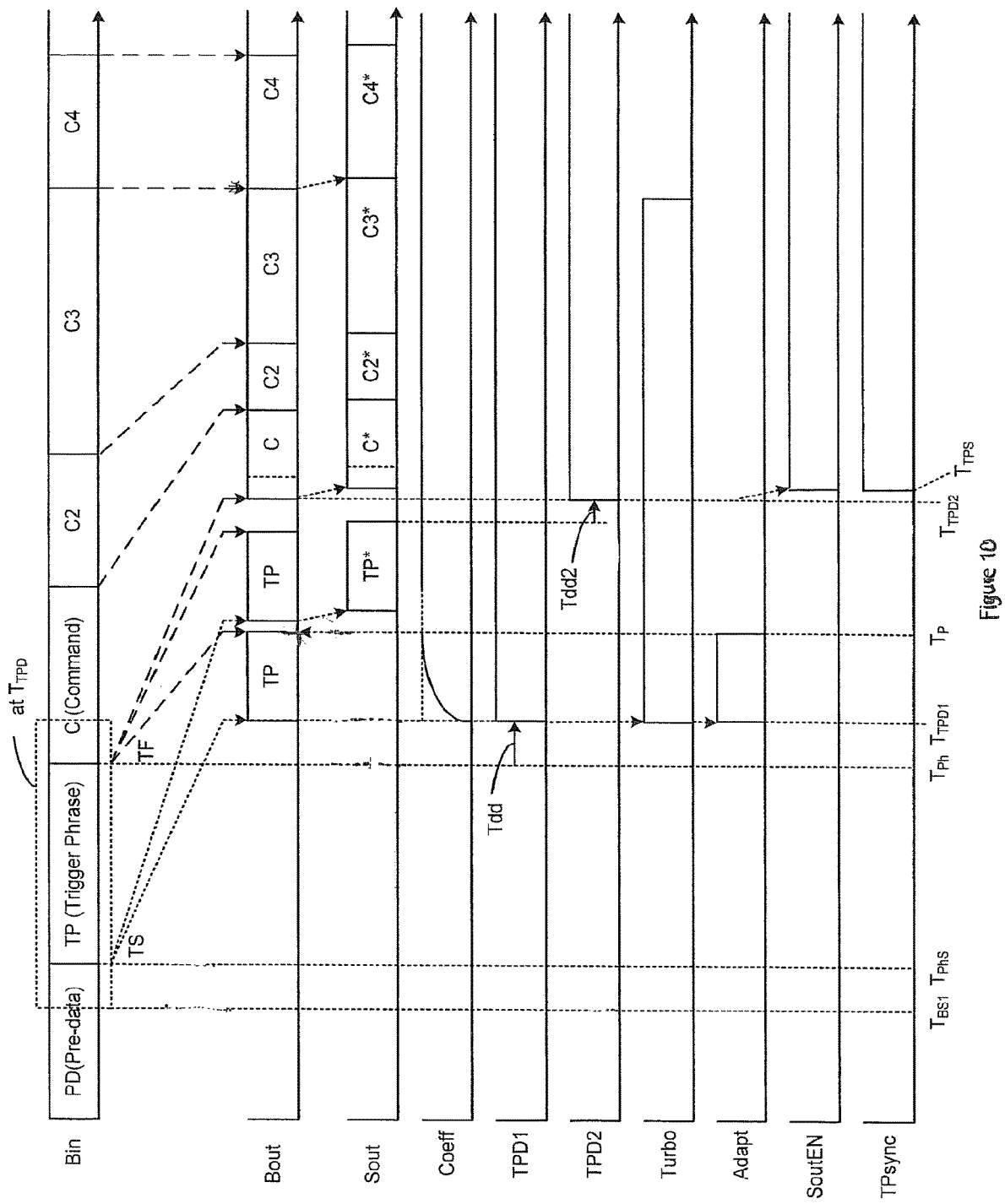
FIG. 10 shows an example of the operation of the system shown in FIG. 9.
Figure 11:
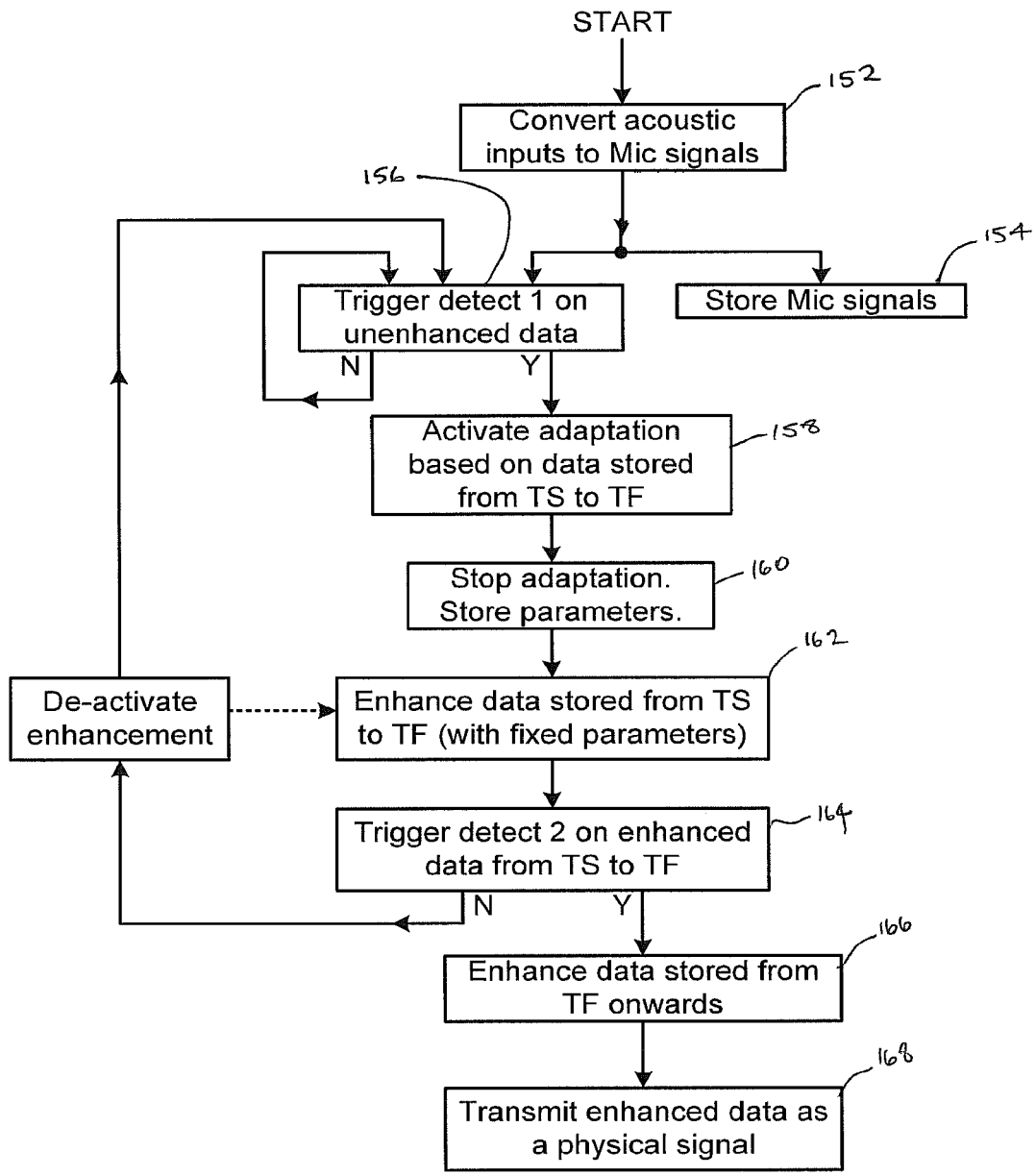
FIG. 11 is a flow chart, showing an example of the operation of the system shown in FIG. 9.

FIG. 10 shows an example of the operation of the system shown in FIG. 9, and FIG. 11 is a flow chart showing the process performed. The process shown in FIG. 7 starts with step 152, in which the acoustic signals received at the microphones 18, 20 are converted into digital electrical signals Bin1, . . . , BinN representing the detected sounds. In step 154, one or more of these microphone signals are stored in the buffer 38. The axis labelled Bin in FIG. 10 shows the data received and written into the buffer 38 at any given time. The start of this writing of data to the buffer 38 may be activated by the level of sound being recorded by the microphone 18 increasing over a threshold value. In other embodiments the buffer 38 may be continuously written to. Over the course of the time shown in FIG. 10 the buffer 38 contains Pre-data (PD), which represents the data recorded by the buffer 38 before the user starts speaking the predefined trigger phrase, trigger phrase data (TP) and four command word data sections (C, C2, C3, C4).

As shown in step 156 of FIG. 11, the first trigger detection block 70 is continually attempting to detect a selected part of the trigger phrase in one or more of the received signals. In this example, the selected part of the trigger phrase is the whole of the trigger phrase, although in other embodiments the selected part of the trigger phrase may be just a part of the trigger phrase, for instance just a first half or a fraction of the trigger phrase, to allow a more rapid response, or the second half or a fraction of the trigger phrase to allow for delay in activation of the trigger phrase detector by some prior more general signal activity detector. The first trigger phrase detection block 70 inevitably has a finite processing time, and so the end of the selected part of the trigger phrase is actually detected and flagged by output TPD1 (FIG. 10) by the first trigger detection block 70 at time $T_{TPD1}$, a time interval Tdd after the end of the data representing the selected part (in this example the whole) of the trigger phrase at $T_{Ph}$.

As mentioned above, the first trigger detection block 70 makes its detection using relatively loose detection criteria, meaning that it has a very high probability of recognising the trigger phrase in the data, but with a significant risk of a false positive.

The detection by the first trigger detection block 70 initiates a number of processes. Firstly, the output of the buffer 38, Bout, is activated, and the read pointer R of the buffer 38 is set to read from a certain number of data points back in time from the current position of the write arrow W. Thus, from time $T_{TPD1}$ the output of the buffer starts to output data that was stored previously: data from some time TS, which is equal to $T_{Phs}$, say.

At time $T_{TPD1}$ the buffer 38 will contain data read from some previous time $T_{BS1}$ (depending on the size of the buffer) up to $T_{TPD1}$. In practice, the exact duration of the trigger phrase will not be known in advance, so to ensure that the data read out includes all of the data representing the trigger phrase (shown as TP in the Bin line in FIG. 10) all data from $T_{BS1}$ up to $T_{TPD1}$ may be read out.

In some embodiments however the first trigger detection block 70 may deliver a good estimate of at least one of: (a) the time $T_{Ph}$ of the actual end of the trigger phrase; or (b) the time $T_{Phs}$ when the trigger phrase actually started. As illustrated in FIG. 10, the data read out on line Bout may thus span from a time TS equal to $T_{Phs}$ to a time TF equal to $T_{Ph}$. Thus the data actually used in training the speech enhancement block 48, includes all of the data representing the trigger phrase (shown as TP in the Bin line in FIG. 10) and none of the preceding or following non-trigger phrase sound data.

Secondly, the detection of the partial trigger phrase causes the control block 42 to activate the enhancement block 48 perhaps by controlling a clock line CK or some control line (not illustrated) and to activate the adaptation of the enhancement block 48 as represented by switching means 50 controlled by command line "Adapt", as shown in FIG. 10 (though this switching take the form of a particular program flow, rather than a physical switching). Thus, in step 158 of the process shown in FIG. 11, this command activates the enhancement block 48 to begin its adaptation. This means that the parameters of the enhancement block 48 are iteratively adapted such that they converge onto preferable values, as shown in FIG. 10 on the axis labelled "Coeff". This convergence usually takes a period of time of the order of one second.

As discussed above, the enhancement block 48 may be a beamformer in this example, and so the process of adaptation involves selecting the weightings and phasings applied to the multiple microphone signals, in order to generate an output signal that has a higher signal to noise ratio.

For example, the beamformer adaptation algorithm may constantly track the loudest voice-like signal so that the beam is always directed towards this signal. It is thus advantageous that the data used to adapt the beamformer comprises only the known trigger phrase, most likely spoken by the user, rather than also comprising other sounds present before or after the trigger phrase, which may include background speech from other people or from a nearby television or public address system for example, towards which the algorithm may erroneously try to steer the beam. Also the adaptation may be optimised towards the trigger phrase (e.g. as regards its likely spectrum) to help reject concurrent background noise. Also not processing irrelevant samples avoids consuming unnecessary power and may reduce the maximum processing speed requirement. Also any reduction in processing time may reduce the need for continuing buffering in the interim, and early discarding of any pre-data (PD) may reduce the buffering size requirements.

The first detection of the trigger phrase, or part thereof, also prompts the control block 42 to send a command "Turbo" to the clock controller 44. This "Turbo" command causes the clock controller 44 to generate a clock signal at a clock rate that is higher than the sample clock rate of the input data Bin. This causes the data to be read from the buffer 38 at a clock rate that is faster than real-time, that is, faster than the clock rate at which the data was written to the buffer 38.

From this point onwards, data is read continually from the buffer 38 (at least until it is determined that the user has stopped speaking). As can be seen from FIG. 10, the rate at which the buffer 38 is being read is kept higher than real-time until the read arrow R of the buffer 38 substantially catches up with the write arrow W at time $T_{T4}$. This means that, by this time, the data being input into the buffer 38 is being output at essentially the same time.

The end of the whole trigger phrase occurs at time $T_{Ph}$. The first trigger detection block 70 has a finite processing time, and so the end of the whole trigger phrase is actually detected by the trigger detection block 70 at time $T_{TPD1}$, a time interval Tdd after the end of the data representing the trigger phrase, or selected part thereof, at $T_{Ph}$.

As mentioned above, the parameters or coefficients of the enhancement block 48 are adapted during the time that a part of the data, that was stored in the buffer 38 during the period before the trigger phrase was detected, is being read out. In the example shown in FIG. 10, the data that is read out includes all of the data up until the time $T_{Ph}$. However, it is also possible to stop reading out this data at an earlier point. For example, the duration of the data that is read out may be set based on an expectation of the time that will be taken for the parameters of the enhancement block 48 to converge on suitable values.

At the time when the selected data stored before the time $T_{Ph}$ has been read out (that is, at the time $T_P$), the command block 42 deactivates further adaptation of the parameters of the enhancement block 48, as shown in step 160 of FIG. 11, by means of a control signal Adapt as illustrated in FIG. 9 in conjunction with the switch 50 and as shown in FIG. 10 on the axis labelled "Adapt". The adapted parameters are then stored for further use. As an alternative, it is possible to control the adaptation of the enhancement block 48, so that the rate of convergence of the parameters is substantially reduced. In either case, this has the effect that there are no sudden changes in the parameters during use of the enhancement block 48, which might tend to have adverse effects on the quality of the output. A maximum permissible rate of change for the coefficients could be derived empirically from testing the sensitivity of the speech recognition function 14 to changes in the coefficients of the enhancement block 48.

At the time $T_P$, the read arrow R is reset, so that the data that is read out from buffer 38 after that point contains at least a part of the data that was read out before that point. Thus, there is an overlap between the data that was read from the buffer and used to train the speech enhancement block 48 before the time $T_P$ and the data that is read from the buffer after the time $T_P$ for enhancement by the speech enhancement block.

In the example shown in FIG. 10, and as shown in step 162 of FIG. 11, the read arrow R is reset to the time point TS, which is the same point that it was set at the time $T_{TPD1}$, so that the data that is read out from the buffer 38 after the time $T_P$ contains all of the data that was used to train the speech enhancement block 48. In this illustrated example, this data contains the whole of the trigger phrase TP. However, depending on the requirements of the speech recognition process, it may not be necessary for the data that is read out from the buffer 38 after the time $T_P$ to contain all of the data representing the trigger phrase TP, and so the read arrow R can be reset to any suitable data point.

Thereafter, the data from the buffer 38 is output again after the time $T_p$, still at a faster rate than real-time.

As shown in the line Bout in FIG. 10, the data that is read out thereafter, originating from original time TS to time TF, is the part of the data stored in the buffer 38 which represents the trigger phrase TP, i.e. from $T_{Phs}$ to $T_{Ph}$ (in this illustrated example—in other examples the data read out may also include some earlier or later data).

As shown in FIG. 9, the output of the speech enhancement block 48 is supplied to the input of the second trigger detection block 72. Thus, in step 164 of the process shown in FIG. 11, the second trigger detection block 72 performs a trigger detection process on the output TP* of the speech enhancement block 48 resulting from the data TP read out from storage in the buffer 38, with the speech enhancement block 48 using the frozen, or only slowly converging, coefficients.

The second trigger detection block 72 may be configured so that it detects the presence of data representing a specified trigger phrase in the data that it receives, or may be configured so that it detects the presence of data representing a specified trigger phrase, when spoken by a particular speaker. The second trigger detection block 72 is tuned so that it has a low false acceptance rate. Thus, the second trigger detection block 72 is configured so that it has more rigorous detection criteria than the first trigger detection block 70. That is, there are certain input signals that would be accepted by the first trigger detection block 70 as containing the trigger phrase, but that would be rejected by the second trigger detection block 72 as not containing the trigger phrase.

In this embodiment, the second trigger detection block 72 benefits from the fact that it is acting on an input signal TP* that has passed through the speech enhancement block 48, and therefore has reduced noise levels. The reduced noise levels may also make it feasible to provide a more reliable speaker recognition function in this block, to verify not only the presence of the defined trigger phrase but also to verify the identity of the person speaking it.

The second trigger detection block 72 has a finite processing time, and so it is only possible to make a determination that the trigger phrase is present at the time $T_{TPD2}$, which is a time Tdd2 later than the time at which the end of the enhanced data TP* was passed to the second trigger detection block 72. If it is found by the second trigger detection block 72 in step 164 of FIG. 11 that the trigger phrase is present, then the second trigger detection block 72 sends a signal TPD2 to the control block 42, and the process passes to step 166, and the data representing the command words C, C2, C3, C4 is passed through the speech enhancement block 48 to generate modified data C*, C2*, C3*, C4*.

At the time $T_{TPD2}$ (or more exactly slightly later, for example to allow for any processing or propagation delay in speech enhancement block 48) a command SoutEN illustrated in FIG. 10 is also sent from the control block 42 to cause the enhanced data output from the enhancement block 48 to be output on the line Sout as illustrated schematically by second switch 52. In step 168 of FIG. 11, this enhanced data Sout is transmitted as an output.

In this example, as illustrated in FIG. 10, the transmitted data starts with data C originally at the potential starting time of the first command word, i.e. at $T_{Ph}$, at the end of the trigger phrase.

A buffer (for example a first-in, first-out buffer) may be provided prior to the switch 52 so that a first part of the enhanced data is stored. The contents of this FIFO buffer may then be supplied on the output to the speech recognition system, only in the event that the second trigger detection block 72 does detect the presence of the trigger phrase, and may be discarded otherwise. Thus the enhanced trigger phrase data TP*, otherwise discarded, may also be transmitted, to be made available for downstream signal processing. The FIFO buffer 76 is illustrated in FIG. 9, but for simplicity FIG. 10 does not illustrate this mode of working: the FIFO is effectively bypassed in the illustrated mode.

The control block 42 may also determine the point at which the trigger phrase TP ends and the first command word C starts, in which case it may generate a synchronization signal, TPsync, to be sent by the control block 42 at the time $T_{TPS}$, at the time at which it determines that the trigger phrase has been processed by the enhancement block 48, and hence that the modified data C* representing the first command word is about to start. This feature may be useful in cases where the enhanced trigger phrase data (e.g. from the FIFO) is transmitted.

Thus, as can be seen from FIG. 10, on the axis labelled Sout, the data output from the DSP 30 comprises the enhanced versions of the trigger phrase data (TP*) and the four processed command word data sections (C*, C2*, C3* and C4*). This outputted data has therefore been processed (for example passed through a beamformer) such that it can be more easily or more accurately recognised by a speech recognition engine, or any other speech processor.

Thus, in the embodiment shown in FIG. 9 and described with reference to FIGS. 10 and 11, the advantages of using an enhancement block such as a beamformer can be realised, but without continually using power by running the beamformer when the background sounds contain no speech, and without needing to perform adaptation on the speech signals that are going to be processed downstream (which has the disadvantage that such adaptation can cause artefacts to appear in the speech signal, creating difficulties for an automatic speech recognition system).

Since the first trigger detection block 70 is tuned with loose criteria, it is quite possible that the first trigger detection block 70 will identify the trigger phrase in the received data, in circumstances where the trigger phrase was not in fact spoken. Therefore, when the control block 42 receives the signal TPD1 indicating that the first trigger detection block 70 has detected the trigger phrase, it monitors for the arrival of the signal TPD2 indicating that the trigger phrase has been detected by the second trigger phrase detection block 72, using its tighter, more rigorous, detection criteria. If the signal TPD2 is not generated within a preset time from the arrival of the signal TPD1, then, in step 170 of the process shown in FIG. 11, a reset signal can be generated, so that the adaptation of the parameters of the enhancement block 48 is stopped, and no data is output from the enhancement block.

Confirmation of the reception of the trigger phrase may also be used to power up other parts of the circuitry or device, for instance to activate other processor cores or enable a display screen. Also in some embodiments a local processor, for example the applications processor, may be used to perform some of the ASR functionality, so signal TPD may be used to activate associated parts of the processor or to load appropriate software onto it.

Figure 12:
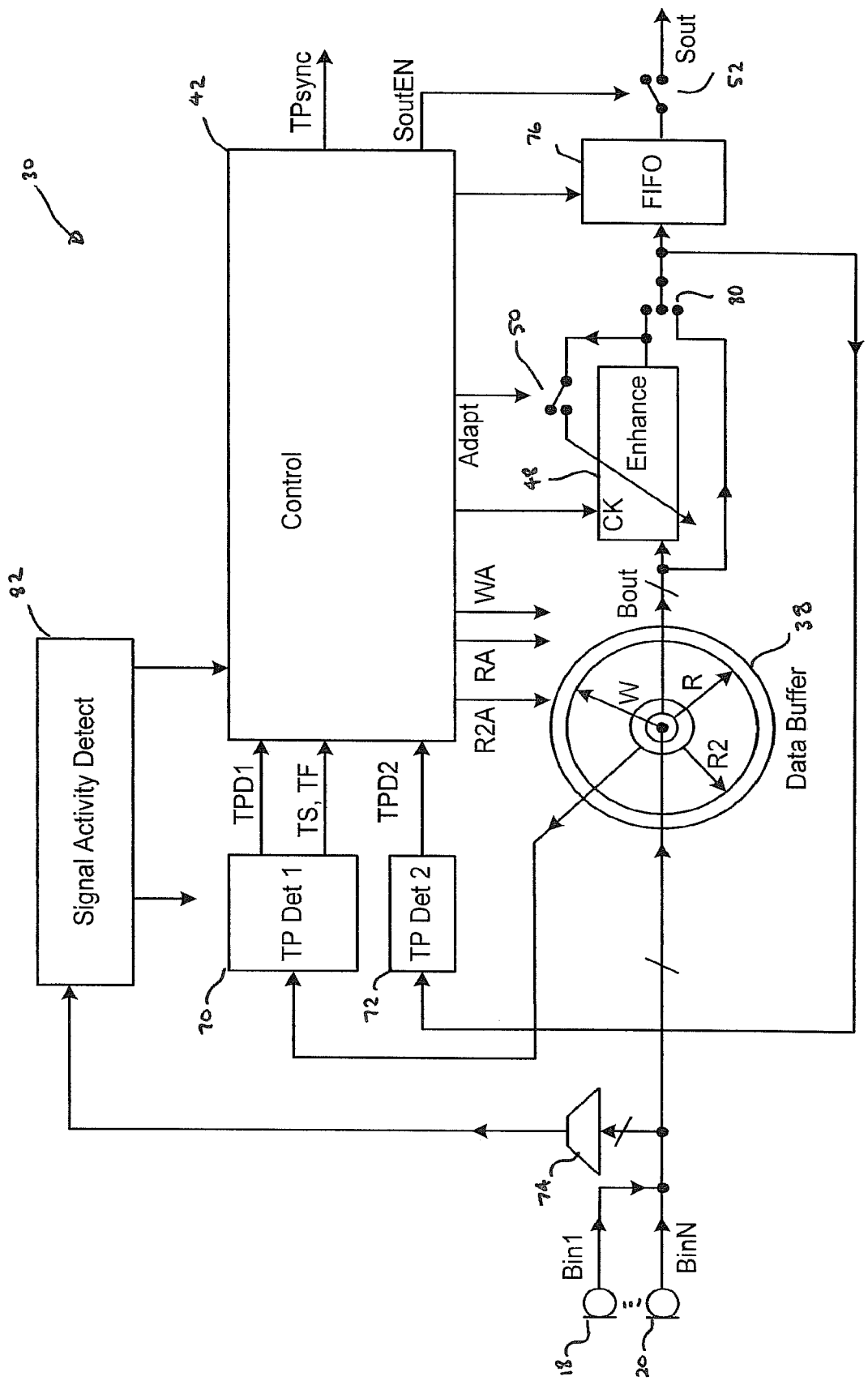
FIG. 12 shows a further alternative embodiment of the digital signal processor.

FIG. 12 shows a further embodiment of the system of the DSP 30 in FIG. 1. The DSP 30 shown in FIG. 12 corresponds in large part to the DSP 30 shown in FIG. 9, and corresponding features in these two figures are indicated by the same reference numerals and will not be described further herein.

Thus, as in FIG. 9, signals from multiple microphones 18, 20 are sent to a buffer 38. There is also a first trigger detection block 70, which detects whether or not data it receives represents a predetermined trigger phrase. A control block 42 receives the output signal, TPD1, from the trigger detection block 40 and, in response to that signal, controls the sequential reading from the buffer 38. The read output of the buffer 38, Bout, is passed to a speech enhancement block 48, which may take the form of, or may at least include an adaptive beamformer functionality. The adaptation of the speech enhancement block 48 is illustrated as controlled by a switching means 50, which is actuated by the control block 42. The output of the speech enhancement block may be supplied to a second trigger phrase detection block, which sends an output signal TPD2 to the control block 42 when it detects the presence of the trigger phrase in the enhanced speech signal. The output of the speech enhancement block, Sout, is controlled, as illustrated by a second switching means 52, which is also actuated by the control block 42. A synchronization signal, TPsync, may be sent in parallel with, or embedded in the same channel as, the Sout data signal.

In FIG. 12, a third switch 80 is provided, for controlling whether signals from buffer 38 are passed to the speech enhancement block 48.

In addition, a signal activity detection block 82 is provided, for detecting an ambient noise level, and for generating and sending control signals to the trigger phrase detection blocks and to the control block 42. In addition to identifying silence, or near silence, the signal activity detection block 82 also characterises the ambient noise in order to establish whether downstream speech recognition is likely to be possible, and if so whether speech enhancement before performing speech recognition will provide significant benefits. This characterisation may for example use the signal (such as Bin1) from just one of the multiple microphones. The characterisation may take place over a relatively long period, with significant time-hysteresis applied so that short intervals of silence, or sudden sharp noises, do not cause inappropriate action to be taken.

The signal activity detection block 82 detects whether the ambient noise falls into one of four categories.

If there is silence, the downstream speech recognition system can be powered down, since there is nothing for it to recognise, so a suitable control signal may be sent to it. Also in some embodiments the trigger phrase detection blocks may be powered down or placed in a low power state until a usable signal appears.

If the noise level is low, speech recognition should work well, so at least the first trigger detection block is active, but the speech enhancement is unnecessary and so the enhancement block can be bypassed and deactivated. It may also be desirable to deactivate at least some of the microphones, saving the power they would consume.

If the noise level is very high, speech recognition will not work well, even with speech enhancement, and so the speech recognition system can be signalled to enter a low power state or power down.

At intermediate noise levels, speech recognition will work, and so at least the first trigger detection block may be active (while a second trigger detector may be active or may be activated in response to the first trigger detection events). Moreover, the speech enhancement is likely to improve the operation of the downstream speech recognition, and so the enhancement block can be brought into a state where it is enableable in response to trigger phrase detection events for example receiving signals from multiple microphones in the case of a beamformer.

The operation of the Signal Activity Detector has been described with respect to a DSP based on that of FIG. 9. Similar operation and control may also be possible in conjunction with other DSP embodiments disclosed above.

These can be summarised as follows:

| Noise Profile | Description | Number of mics on | Trigger Detect | Enhancement/ Beamforming | Speech Recog'n |
|---|---|---|---|---|---|
| Silence | Background noise below or near system noise level | One | Off | Off | Off |
| Quiet | No need for enhancement - save power by not enabling | One | On | Off | Enableable (*) |
| Noisy | Enough noise to make enhancement worthwhile | Multiple | On | Enableable (*) | Enableable (*) |
| Extreme | Too noisy for trigger recognition or ASR. | One | Off | Off | Off |

(*) Enableable in response to upstream trigger phrase detection.

As mentioned above, there may be a time delay between the actual onset of signal activity and its detection by the Signal Activity Detect block. If the first signal is actually the user speaking the trigger phrase, and if the first trigger detector is initially disabled then the first trigger detector may miss the start of the spoken trigger phrase and fail to detect it. Thus the input to the first trigger phrase detector may be taken from an output of the buffer 38, controlled by a separate address pointer from the control block 42, thus recovering a stream of data delayed to allow for the delay in signal activity detection.

Alternatively, it may be preferable to keep the first trigger detector permanently enabled in parallel with the Signal Activity Detector. As it is a simple detector it may not consume much power. However the bypass and disabling of the speech enhancement block may still be controlled by the Signal Activity Block.

There is therefore provided a speech processing system that allows enhanced data to be output, while maintaining the low power operation of the system.

The skilled person will recognise that some aspects of the above-described apparatus and methods, for example the calculations performed by the processor may be embodied as processor control code, for example on a non-volatile carrier medium such as a disk, CD- or DVD-ROM, programmed memory such as read only memory (Firmware), or on a data carrier such as an optical or electrical signal carrier. For many applications embodiments of the invention will be implemented on a DSP (Digital Signal Processor), ASIC (Application Specific Integrated Circuit) or FPGA (Field Programmable Gate Array). Thus the code may comprise conventional program code or microcode or, for example code for setting up or controlling an ASIC or FPGA. The code may also comprise code for dynamically configuring re-configurable apparatus such as re-programmable logic gate arrays. Similarly the code may comprise code for a hardware description language such as Verilog™ or VHDL (Very high speed integrated circuit Hardware Description Language). As the skilled person will appreciate, the code may be distributed between a plurality of coupled components in communication with one another. Where appropriate, the embodiments may also be implemented using code running on a field-(re)programmable analogue array or similar device in order to configure analogue hardware.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfil the functions of several units recited in the claims. The word "amplify" can also mean "attenuate", i.e. decrease, as well as increase and vice versa and the word "add" can also mean "subtract", i.e. decrease, as well as increase and vice versa. Any reference numerals or labels in the claims shall not be construed so as to limit their scope.

The invention claimed is:

1. A method of processing received data representing speech, comprising:
   storing the received data;
   detecting a presence of data representing a first predefined trigger phrase in the received data;
   in response to said detecting, supplying a first part of the stored data representing at least a part of the first predefined trigger phrase to an adaptive speech enhancement block;
   training the speech enhancement block on the first part of the stored data to derive adapted parameters for the speech enhancement block;
   supplying a second part of the stored data to the adaptive speech enhancement block operating with said adapted parameters, wherein the second part of the stored data overlaps with the first part of the stored data; and
   outputting enhanced speech data from the speech enhancement block.

2. A method as claimed in claim 1, wherein the first predefined trigger phrase is a part of a whole predefined trigger phrase, the method comprising attempting to detect the whole predefined trigger phrase, and
   further comprising supplying the second part of the stored data to the adaptive speech enhancement block only if the whole predefined trigger phrase is detected.

3. A method as claimed in claim 1 wherein the first part of the stored data is the data stored from a first defined starting point.

4. A method as claimed in claim 3 wherein the second part of the stored data is the data stored from a second defined starting point, and the second defined starting point is later than the first defined starting point.

5. A method as claimed in claim 1, wherein the second part of the stored data comprises data representing at least part of the whole predefined trigger phrase.

6. A method as claimed in claim 1, further comprising sending the output enhanced speech data from the speech enhancement block to a speech recognition engine.

7. A method as claimed in claim 6, comprising sending the output enhanced speech data from the speech enhancement block to the speech recognition engine within a single device.

8. A method as claimed in claim 1, comprising supplying the second part of the stored data to the speech enhancement block and outputting the enhanced speech data from the speech enhancement block at a higher rate than real time.

9. A method as claimed in claim 8, comprising supplying the second part of the stored data to the speech enhancement block and outputting the enhanced speech data from the speech enhancement block at a higher rate than real time until the data being supplied is substantially time aligned with the data being stored.

10. A method as claimed in claim 1, further comprising performing a second adaptive speech enhancement on the received speech data.

11. A method as claimed in claim 10, further comprising inhibiting adaptation of the second adaptive speech enhancement while training the speech enhancement block.

12. A method as claimed in claim 11, further comprising resuming adaptation of the second adaptive speech enhancement after training the speech enhancement block.

13. A method as claimed in claim 11, wherein the second adaptive speech enhancement is an acoustic echo cancellation.

14. A speech processor, comprising:
   an input, for receiving data representing speech; and
   a speech processing block,
   wherein the speech processing block is configured to perform a method comprising:
   storing the received data;
   detecting a presence of data representing a first predefined trigger phrase in the received data;
   in response to said detecting, supplying a first part of the stored data representing at least a part of the first predefined trigger phrase to an adaptive speech enhancement block;
   training the speech enhancement block on the first part of the stored data to derive adapted parameters for the speech enhancement block;
   supplying a second part of the stored data to the adaptive speech enhancement block operating with said adapted parameters, wherein the second part of the stored data overlaps with the first part of the stored data; and
   outputting enhanced speech data from the speech enhancement block to the speech processing block.

15. A speech processor as claimed in claim 14, wherein the speech processing block comprises a speech recognition engine.

16. A mobile device, comprising a speech processor as claimed in claim 14.

17. A speech processor, comprising:
an input, for receiving data representing speech; and
an output, for connection to a speech processing block, wherein the speech processing block is configured to perform a method comprising:
storing the received data;
detecting a presence of data representing a first predefined trigger phrase in the received data;
in response to said detecting, supplying a first part of the stored data representing at least a part of the first predefined trigger phrase to an adaptive speech enhancement block;
training the speech enhancement block on the first part of the stored data to derive adapted parameters for the speech enhancement block;
supplying a second part of the stored data to the adaptive speech enhancement block operating with said adapted parameters, wherein the second part of the stored data overlaps with the first part of the stored data; and
outputting enhanced speech data from the speech enhancement block to the output, for connection to the speech processing block.

18. A speech processor as claimed in claim 17, wherein the speech processing block comprises a speech recognition engine.

19. A mobile device, comprising a speech processor as claimed in claim 17.

* * * * *